United States Patent Office 3,382,301
Patented May 7, 1968

3,382,301
DIHYDROXY PHOSPHONATES
Ingenuin Hechenbleikner, Kenwood, and Kenneth R. Molt, Cincinnati, Ohio, assignors to Carlisle Chemical Works, Inc., Reading, Ohio, a corporation of Ohio
No Drawing. Continuation-in-part of application Ser. No. 245,976, Dec. 20, 1962. This application Sept. 3, 1964, Ser. No. 394,320
5 Claims. (Cl. 260—953)

ABSTRACT OF THE DISCLOSURE

Dihydroxy phosphonates of the formula $$\begin{array}{c}R_1O\\ \diagdown\\ R_2O\end{array}\!\!\!\overset{O}{\overset{\|}{P}}\!\!-\!(CH_2CHO)_v(CH_2)_n\!-\!\underset{\underset{OH}{|}}{C}\!-\!(\underset{\underset{OH}{|}}{C})_m\!\!\!\begin{array}{c}R_4\ R_5\\ \diagdown\!\diagup\\ \diagup\!\diagdown\end{array}$$

where $R_1$ and $R_2$ are selected from the group consisting of alkyl, alkenyl, monocyclic carbocyclic aryl, naphthyl, benzyl, alkyl benzyl and halophenyl;

$R_3$ is selected from the group consisting of hydrogen and lower alkyl;

$R_4$ and $R_5$ are selected from the group consisting of hydrogen and alkyl;

$R_8$ is selected from the group consisting of hydrogen, alkyl and monocyclic carbocyclic aryl;

$v$ is an integer of at least zero;

$m$ is an integer between 1 and 2 inclusive; and $n$ is an integer between 1 and 10 inclusive, are prepared by hydrolyzing corresponding 1,3-dioxolanes and 1,3-dioxanes.

---

This application is a continuation-in-part of application 245,976, filed Dec. 20, 1962, now Patent 3,206,474, which in turn is a continuation-in-part of application 214,508, filed Aug. 3, 1962, now Patent 3,096,345 issued July 2, 1963.

The present invention relates to novel phosphonates.

It is an object of the present invention to prepare phosphonates of polyhydric alcohols having at least three hydroxyl groups.

Another object is to prepare novel heterocyclic acetal and ketal phosphonates.

A further object is to prepare novel phosphonates by the hydrolysis of acetal and ketal phosphonates.

A still further object is to prepare novel open chain acetal and ketal phosphonates.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by preparing novel acetals and ketals having one of the formulae $$\begin{array}{c}O\\ \|\\ R_7\!-\!\underset{\underset{R_8O}{|}}{P}\!-\!OR_9\end{array}$$

I where $R_7$ is alkyl, alkenyl, aralkyl or $R_9$, $R_8$ is alkyl, alkenyl, aralkyl, aryl, haloaryl or $R_9$ and $R_9$ is $$-(CH_2CHO)_v(CH_2)_n\!-\!\underset{\underset{\underset{R_2}{\diagup}\overset{\diagdown}{R_1}}{\overset{|}{C}}}{\overset{R_3}{\underset{|}{\underset{|}{C}}}}\!-\!(\overset{R_4\ R_5}{\underset{\underset{O}{|}}{\overset{|}{C}}})_m\!\!\begin{array}{c}\\ \diagdown\\ \diagup\end{array}$$

where $R_1$ is hydrogen alkyl, aryl, haloaryl or nitroaryl, $R_2$ is hydrogen, alkyl aryl, haloaryl or nitroaryl; or $$\begin{array}{c}C\\ \diagup\ \diagdown\\ R_2\quad R_1\end{array}$$

is an alicyclic, i.e., a cycloalkyl group, $R_3$ is hydrogen, alkyl or aryl, $R_4$ is hydrogen or alkyl, $R_5$ is hydrogen or alkyl, $R_6$ is hydrogen, or lower alkyl, e.g., methyl or ethyl, $v$ is 0 or an integer, e.g., from 1 to 100, $n$ is an integer between 1 and 10, $m$ is 1 or 2;

$$R_{10}\!-\!\overset{O}{\overset{\|}{P}}\!\!\begin{array}{c}O-CH_2\\ \diagup\\ \diagdown\\ O-CH_2\end{array}\!\!\underset{\diagdown}{\overset{\diagup}{C}}\!\!\begin{array}{c}CH_2\!-\!O\\ \diagdown\\ \diagup\\ CH_2\!-\!O\end{array}\!\!\underset{\diagdown}{\overset{\diagup}{C}}\!\!\begin{array}{c}R_1\\ \diagdown\\ \diagup\\ R_2\end{array}$$

II where $R_{10}$ is alkyl, alkenyl or aralkyl and $R_1$ and $R_2$ are as defined above $$\begin{array}{c}O\quad\quad R_1\quad\quad O\\ \|\quad\quad\ \ |\quad\quad\ \ \|\\ R_{10}\!-\!\underset{\underset{R_{11}\!-\!O}{|}}{P}\!-\!O(CH_2)_2\!-\!O\!-\!\underset{\underset{R_2}{|}}{C}\!-\!O\!-\!(CH_2)_2O\underset{\underset{OR_1}{|}}{P}\!-\!R_{10}\end{array}$$

III where $R_{11}$ is alkyl, alkenyl aryl, haloaryl or aralkyl and $R_1$, $R_2$, and $R_{10}$ are as defined above $$\begin{array}{c}O\quad R_6\quad\quad\quad R_6\quad R_1\quad\quad R_5\quad R_6\quad\quad O\\ \|\quad\ |\quad\quad\quad\ |\quad\ |\quad\quad\ |\quad\ |\quad\quad\ \|\\ R_{10}\!-\!\underset{\underset{R_{11}\!-\!O}{|}}{P}\!-\!O(CH_2\overset{|}{C}HO)_x\!-\!OCH_2\overset{|}{C}HO\overset{|}{\underset{\underset{R_2}{|}}{C}}OOH_2\overset{|}{C}HO(CH_2CH)O_x\!-\!\underset{\underset{OR_{11}}{|}}{P}\!-\!R_{10}\end{array}$$

IV where $R_1$, $R_2$, $R_6$, $R_{10}$, $R_{11}$ are as defined above and $x$ is an integer of at least 1, e.g., from 1 to 100.

There are also included phosphonates of diacetals and ketals or hexitols such as sorbitol and mannitol. Typical of such materials are compounds having the formula $$\begin{array}{c}\quad\quad\quad\quad\quad H_2C\!-\!O\quad\ R_1\\ \quad\quad\quad\quad\quad\ \ |\quad\quad\ \diagdown\!\diagup\\ \quad\quad\quad\quad\quad\ CH\quad\quad C\\ R_1\quad\ \ O\quad\ |\quad\ \ \diagup\!\diagdown\\ \diagdown\!\diagup\quad\quad CH\!-\!O\quad R_2\\ C\quad\quad\quad\ |\\ \diagup\!\diagdown\quad\quad CH\\ R_2\quad\ \ O\quad\ |\quad\quad\quad O\\ \quad\quad\quad\quad\quad CH\!-\!O\quad\ \|\\ \quad\quad\quad\quad\quad\ \ |\quad\quad\ \diagdown\\ \quad\quad\quad\quad\quad\quad\quad\quad\quad\ \ P\!-\!R_{10}\\ \quad\quad\quad\quad\quad CH_2\!-\!O\ \diagup\end{array}$$

V where $R_1$, $R_2$ and $R_{10}$ are as defined above.

In Formula V no attempt has been made to show the position of the hydrogen atoms on the asymmetric carbon atoms. The position of the acetal and ketal groups also can be varied so long as there are two such groups in the molecule.

The compounds of the present invention are useful as water dispersible wetting and suspending agents. They can also be employed as fire retardants for cellulose, cellulose esters, e.g. cellulose acetate, polyolefin resins, e.g. polyethylene and polypropylene.

A particular important use for the acetals and ketals of the present invention is to hydrolyze them to give hydroxyl containing phosphonates. Such hydroxyl containing phosphonates have the following formulae

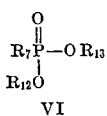

VI wherein $R_7$ is as defined above, $R_{12}$ is alkyl, alkenyl, aralkyl, aryl, haloaryl or $R_{13}$ and $R_{13}$ as

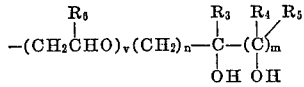

where $R_3$, $R_4$, $R_5$, $R_6$, $v$, $n$ and $m$ are as defined above;

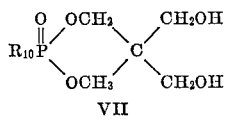

VII wherein $R_{10}$ is as defined above;

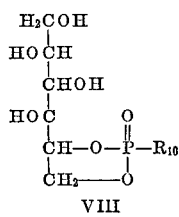

VIII where $R_{10}$ is as defined above.

The hydrolyzed phosphonates, i.e. the compounds of Formulae VI, VII, and VIII, have the uses set forth supra and in addition are useful for preparing polyurethanes by reaction with organic isocyanates, e.g. toluene diisocyanate and PAPI (polyphenylene isocyanate averaging about 3 units in the poymer). The polyurethanes can be prepared as foams or as elastomers. The presence of the phosponate group renders the polyurethane flame resistant. The phosphonate need be used only as a portion of the polyols employed. Thus, the use of 20% of a polyhydroxyl containing phosphonate according to the present and 80% of another polyol, e.g. glycerine propylene oxide adduct molecular weight 3000 or polypropylene glycol 2025 will give a polyurethane with improved flame resistance.

The novel compounds of Formulae I through V of the present invention are prepared by Arbuzov rearrangement of the corresponding phosphite prepared according to the parent application. The entire disclosure of the parent application is hereby incorporated by reference.

Thus, there is employed an alkyl halide, alkenyl halide, aralkyl halide, halohydrin or epihalohydrin with a phosphite of the parent application that is isomeric with a phosphonate of Formulae I through V above. The iodides and bromides are preferred although there can also be employed the chlorides. The halides can be employed in catalytic amounts, e.g. 0.5–5 mol precent based on the phosphite to be rearranged. If the hydrocarbon group of the halide is the same as one of the esterifying groups of the phosphite, then no impurities are introduced into the phosphonate product. By employing a large amount of the halide, e.g. 80 mol percent, or perferably 100 mol percent or more, based on the phosphite employed in the Arbuzov reaction, then the product is one in which one of the esterifying groups on the phosphorus atom is removed and the phosphorous atom is directly attached to the hydrocarbon, hydroxyhydrocarbon or epoxyhydrocarbon group of the halide employed. When one of the esterifying groups of the phosphite is aryl or haloaryl, sufficient alkyl halide or the like must be used to replace the aryl or haloaryl group since aryl halides do not normally take part in the Arbuzov reaction. The Arbuzov reaction is usally carried out at elevated temperatures, e.g. 120–200° C. at atmospheric, subatmospheric or superatmospheric pressure. The halide remaining after the reaction can normally be removed by distillation.

Among the halides which are employed in the Arbuzov reaction are methyl bromide,
methyl iodide,
ethyl bromide,
ethyl iodide,
n-propyl iodide,
isopropyl iodide,
amyl bromide,
amyl chloride,
amyl iodide,
butyl bromide,
hexyl iodide,
octyl bromide,
octyl iodide,
decyl bromide,
decyl iodide,
dodecyl iodide,
octadecyl bromide,
octadecyl iodide,
allyl bromide,
allyl iodide,
allyl chloride,
methallyl iodide,
crotyl bromide,
vinyl bromide,
oleyl bromide,
oleyl iodide,
benzyl chloride,
benzyl bromide,
benzyl iodide,
o-dodecylbenzyl chloride,
p-dodecylbenzyl chloride,
m-dodecylbenzyl chloride,
p-dodecylbenzyl bromide,
epichlorhydrin,
epibromohydrin,
epiiodohydrin,
ethylene chlorhydrin,
ethylene bromohydrin,
ethylene iodohydrin,
propylene chlorhydrin,
propylene bromohydrin.

The compounds of Formulae VI through VIII are prepared by hydrolysis of the compounds of Formulae I, II, and V. The hydrolysis is carried out with the aid of water, preferably with heating, e.g. up to 100° C. The reaction mixture is usually slightly acidic due to the starting phosphonate. After hydrolysis is completed, an alkaline material, e.g. sodium hydroxide, sodium carbonate, sodium bicarbonate or potassium hydroxide is added to neutralize the product.

Illustrative examples of starting phosphites (which can be prepared in the manner set forth in the parent application) to prepare the phosphonates of Formula I are phenyl bis (4-(2-methyl-2-ethyl-1,3-dioxacyclopentyl) methyl) phosphite diphenyl-4-(2-methyl-2-ethyl-1,3-dioxacyclopentyl) methyl phosphite;
methyl bis (4-(2-methyl-2-ethyl-1,3-dioxacyclopentyl)-methyl) phosphite;
dimethyl 4-(2-methyl-2-ethyl-1,3-dioxacyclopentyl)methyl phosphite;
ethyl bis(4-(2-methyl-2-ethyl-1,3-dioxacyclopentyl)-methyl) phosphite,
tris(4-(2-methyl-2-ethyl-1,3-dioxacyclopentyl) methyl) phosphite;
decyl bis(4-(2-methyl-2-ethyl-1,3-dioxacyclopentyl) methyl) phosphite;
octadecyl bis(4-(2-methyl-2-ethyl-1,3-dioxacyclopentyl) methyl) phosphite;
dioctadecyl 4-(2-methyl-2-ethyl-1,3-dioxacyclopentyl) methyl phosphite;
oleyl-bis (4-(2-methyl-2-ethyl-1,3-dioxacyclopentyl) methyl) phosphite;
benzyl-bis (4-(2-methyl-2-ethyl-1,3-dioxacyclopentyl) methyl) phosphite;
p-dodecylbenzyl-bis (4-(2-methyl-2-ethyl-1,3-dioxacyclopentyl) methyl) phosphite;
cyclohexyl-bis-(4-(2-methyl-2-ethyl-1,3-dioxacyclopentyl) methyl) phosphite;
tris (5-(2,5-dimethyl-2-ethyl-1,3-dioxacyclohexyl)methyl) phosphite;
ethyl-bis (5-(2,5-dimethyl-2-ethyl-1,3-dioxacyclohexyl) methyl) phosphite;
dimethyl-5-(2,5-dimethyl-2-ethyl-1,3-dioxacyclohexyl) methyl phosphite;
lauryl-bis-(5-(2,5-dimethyl-2-ethyl-1,3-dioxacyclohexyl) methyl) phosphite;
allyl-bis (5-(2,5-dimethyl-2-ethyl-1,3-dioxacyclohexyl) methyl) phosphite;

cyclopentyl-bis (5-(2,5-dimethyl-2-ethyl-1,3-dioxacyclohexyl) methyl) phosphite;
dibutyl-5-(2,2,5-trimethyl-1,3-dioxacyclohexyl) methyl phosphite;
butyl-bis (5-(2,2,5-trimethyl-1,3-dioxacyclohexyl) methyl) phosphite;
tris (5-(2,2,5-trimethyl-1,3-dioxacyclohexyl) methyl) phosphite;
propyl-bis (5-(2,2,5-trimethyl-1,3-dioxacyclohexyl) methyl) phosphite;
tris (4-(2,2-dimethyl-1,3-dioxacyclopentyl) methyl) phosphite;
methyl-bis (4-(2,2-dimethyl-1,3-dioxacyclopentyl) methyl) phosphite;
octadecyl-bis (4-(2,2-dimethyl-1,3-dioxacyclopentyl) methyl) phosphite;
isobutyl bis (4-(2,2-dimethyl-1,3-dioxacyclopentyl) methyl) phosphite;
ethyl bis (4-(1,3-dioxacyclopentyl) methyl) phosphite;
tris(4-(1,3-dioxacyclopentyl) methyl) phosphite;
dioctadecyl (4-(1,3-dioxacyclopentyl) methyl) phosphite;
tris(4-(2-methyl-1,3-dioxacyclopentyl)methyl) phosphite;
ethyl bis(4-(2-methyl-1,3-dioxacyclopentyl)methyl) phosphite;
tris(4-(2-ethyl-1,3-dioxacyclopentyl)methyl) phosphite;
methyl bis(4-(2-ethyl-1,3-dioxacyclopentyl) methyl) phosphite;
dioleyl 4-(2-ethyl-1,3-dioxacyclopentyl) methyl phosphite;
tris(4-(2-propyl-1,3-dioxacyclopentyl)methyl) phosphite;
benzyl bis(4-(2-propyl-1,3-dioxacyclopentyl)methyl) phosphite;
decyl bis(4-(2-propyl-1,3-dioxacyclopentyl) methyl) phosphite;
ethyl bis(4-(2-heptadecyl-1,3-dioxacyclopentyl)methyl) phosphite;
methyl bis(4-(2-heptadecenyl-1,3-dioxacyclopentyl) methyl) phosphite;
tris(4-(2-vinyl-1,3-dioxacyclopentyl)methyl) phosphite;
amyl bis(4-(2-vinyl-1,3-dioxacyclopentyl)methyl) phosphite;
dodecyl bis(4-(2-phenyl-1,3-dioxacyclopentyl)methyl) phosphite;
octyl bis(4-(2-methylphenyl-1,3-dioxacylopentyl) methyl) phosphite;
octadecyl bis(4-(2-o-chlorophenyl-1,3-dioxacyclopentyl) methyl) phosphite;
ethyl bis(4-(2-m-nitrophenyl-1,3-dioxacyclopentyl) methyl) phosphite;
tris(4-(2-bromophenyl-1,3-dioxacyclopentyl)methyl) phosphite;
tris(4-(2-methyl-2-propyl-1,3-dioxacyclopentyl)methyl) phosphite;
decyl bis(4-(2-methyl-2-propyl-1,3-dioxacyclopentyl) methyl) phosphite;
tris(4-(2,2-diethyl-1,3-dioxacyclopentyl)methyl) phosphite;
diamyl 4(2,2-diethyl-1,3-dioxacyclopentyl) methyl phosphite;
methyl bis(4-(2-methyl-2-butyl-1,3-dioxacyclopentyl) methyl) phosphite;
tris(4-(2-ethyl-2-propyl-1,3-dioxacyclopentyl) methyl) phosphite;
methyl bis(4-(2-ethyl-2-propyl-1,3-dioxacyclopentyl) methyl) phosphite;
ethyl bis(4-2,2-dipropyl-1,3-dioxacyclopentyl) methyl) phosphite;
tris(4-(2,2-diheptadecyl-1,3-dioxacyclopentyl)methyl) phosphite;
butyl bis-(4-(2,2-diheptadecyl-1,3-dioxacyclopentyl) methyl) phosphite;
tris(3(1,4-dioxaspiro (5,5) decyl) methyl) phosphite;
butyl bis(3(1,4-dioxaspiro(5,5) decyl)methyl) phosphite;
methyl bis(3(1,4-dioxaspiro (5,5) nonyl) methyl) phosphite;
tris(4(2,2-diphenyl-1,3-dioxacyclopentyl)methyl) phosphite;
octyl bis(4-(2,2-diphenyl-1,3-dioxacyclopentyl)methyl) phosphite;
tris(4-(2-methyl-2-phenyl-1,3-dioxacyclopentyl)methyl) phosphite;
methyl bis(4-(2-methyl-2-phenyl-1,3-dioxacyclopentyl) methyl) phosphite;
ethyl bis(4-(2,2-dimethyl-1,3-dioxacyclopentyl)propoxymethyl)phosphite;
methyl bis(4(2-methyl-2-ethyl-1,3-dioxacyclopentyl) polyethoxy methyl) phosphite where the polyethyoxy radical contains 30 ethoxy groups;

tris(4(2,2-dimethyl-1,3-dioxacyclopentyl)butyl) phosphite;
decyl bis(4-(2,2-dimethyl-1,3-dioxacyclopentyl)butyl) phosphite;
diethyl 4-(1,3-dioxacyclopentyl)butyl phosphite;
methyl bis(4(2-methyl-1,3-dioxacyclopentyl)butyl) phosphite;
hexyl bis(4(2-methyl-2-ethyl-1,3-dioxacyclopentyl) butyl) phosphite;
tris (4-1,3-dioxacyclopentyl) butyl) phosphite;
methyl bis (4(1,3-dioxacyclopentyl) butyl) phosphite;
ethyl bis (4(2-methyl-1,3-dioxacyclopentyl) butyl) phosphite;
benzyl bis (4(2,2-dimethyl-1,3-dioxacyclopentyl) butyl) phosphite;
heptyl bis (4(2,2-diphenyl-1,3-dioxacyclopentyl) butyl) phosphite;
tris (4(2,2,5-trimethyl-1,3-dioxacyclopentyl) methyl) phosphite;
propyl-bis (4(2,2,5-trimethyl-1,3-dioxacyclopentyl) methyl) phosphite;
butyl bis (4(2,2-dimethyl-5-ethyl-1,3-dioxacyclopentyl) methyl) phosphite;
methyl-bis (4(2,4,5-trimethyl-2-ethyl-1,3-dioxacyclopentyl) methyl) phosphite;
decyl-bis-(5(2,5-dimethyl-1,3dioxacyclohexyl) methyl) phosphite;
butyl-bis (5(2-methyl-2,5-diethyl-1,3-dioxacyclohexyl) methyl) phosphite;
diamyl-5 (2-methyl-2,5-diethyl-1,3-dioxacyclohexyl) methyl phosphite;
ethyl bis (5(2,2-dimethyl-5-propyl-1,3-dioxacyclohexyl) methyl) phosphite;
allyl bis (5(2,2-dimethyl-5-heptadecyl-1,3-dioxacyclohexyl) methyl) phosphite;
tris 5 (5-methyl-1,3-dioxacyclohexyl) methyl) phosphite;
cetyl-bis (5(5-methyl-1,3-dioxacyclohexyl) methyl) phosphite;
tris (5(5-ethyl-1,3-dioxacyclohexyl) methyl) phosphite;
tris (5(5-methyl-1,3-dioxacyclohexyl) methyl) phosphite;
tris (5 (2,5-dimethyl-1,3-dioxacyclohexyl) methyl) phosphite;
ethyl bis (5 (2,5-dimethyl-1,3-dioxacyclohexyl) methyl) phosphite;
tris (5 (2-methyl-5-ethyl-1,3-dioxacyclohexyl) methyl) phosphite;
ethyl bis (5 (2-methyl-5-ethyl-1,3-dioxacyclohexyl) methyl) phosphite;
methyl bis (5 (2-isobutyl-5-ethyl-1,3-dioxacyclohexyl) methyl) phosphite;
propyl-bis (5-(2-phenyl-5-ethyl-1,3-dioxacyclohexyl) methyl) phosphite,
dimethyl-5 (2,2-dimethyl-5-ethyl-1,3-dioxacyclohexyl) methyl phosphite;
tris (5 (2,2,5-trimethyl-1,3-dioxacyclohexyl) methyl) phosphite;

propyl-bis (5 (2,2,5-trimethyl-1,3-dioxacyclohexyl) methyl) phosphite;
methyl bis (5 (2-methyl-2-phenyl-5-ethyl-1,3-dioxacyclohexyl) methyl) phosphite;
ethyl bis (5 (2,5-dimethyl-2-phenyl-1,3-dioxacyclohexyl) methyl) phosphite;
tris (5 (2,2-diethyl-5-methyl-1,3-dioxacyclohexyl) methyl) phosphite;
octadecyl-bis (5 (2,2-diethyl-5-methyl-1,3-dioxacyclohexyl) methyl) phosphite;
tris (3 (3-methyl-1,5-dioxaspiro (6,6) undecyl) methyl) phosphite;
amyl-bis (3 (3-methyl-1,5-dioxaspiro (6,6) undecyl) methyl) phosphite;
tris (3 (3-ethyl-1,5-dioxaspiro (6,6) undecyl) methyl) phosphite;
butyl-bis (3 (3-ethyl-1,5-dioxaspiro (6,6) undecyl) methyl) phosphite;
ethyl bis (5 (2-cyclohexyl-5-methyl-1,3-dioxacyclohexyl) methyl) phosphite;
methyl bis (5 (2,2-diamyl-5-ethyl-1,3-dioxacyclohexyl) methyl) phosphite;
methyl-bis (5 (2,2-dimethyl-5-phenyl-1,3-dioxacyclohexyl) methyl) phosphite.

Illustrative of phosphonates of the present invention within Formula I are phenyl (4-(2-methyl-2-ethyl-1,3-dioxacyclopentyl) methyl) methylphosphonate;
bis (4-(2-methyl-2-ethyl-1,3-dioxacyclopentyl) methyl) methylphosphonate;
bis (4-(2-methyl-2-ethyl-1,3-dioxacyclopentyl) methyl) 2-hydroxyethylphosphonate;
bis (4-(2-methyl-2-ethyl-1,3-dioxacylopentyl) methyl)-2-hydroxypropylphosphonate;
bis (4-(2-methyl-2-ethyl-1,3dioxacyclopentyl)methyl) epoxypropylphosphonate;
methyl (4-(2-methyl-2-ethyl-1,3-dioxacyclopentyl) methyl) methyl phosphonate;
bis (4- (2-methyl-2-ethyl-1,3-dioxacyclopentyl)methyl) ethane phosphonate;
bis (4(2-methyl-2-ethyl-1,3-dioxacyclopentyl) methyl) 4-(2-methyl-2-ethyl-1,3-dioxacyclopentyl) methane phosphonate;
bis (4-(2-methyl-2-ethyl-1,3-dioxacyclopentyl) methyl) decane phosphonate;
bis (4-(2-methyl-2-ethyl-1,3-dioxacyclopentyl) methyl) octadecane phosphonate;
octadecyl 4-(2-methyl-2-ethyl-1,3-dioxacyclopentyl) methyl octadecane phosphonate

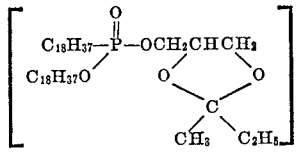

bis (4-(2-methyl-2-ethyl-1,3-dioxacyclopentyl) methyl) Δ⁹-octadecene phosphonate;
bis (4-(2-methyl-2-ethyl-1,3-dioxacyclopentyl) methyl) phenylmethane phosphonate

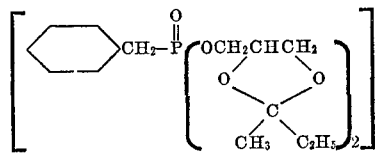

bis (4-(2-methyl-2-ethyl-1,3-dioxacyclopentyl) methyl) p-dodecylphenyl-methane phosphonate;
bis (4-(2-methyl-2-ethyl-1,3-dioxacyclopentyl) methyl) cyclohexane phosphonate;
bis (5- (2,5-dimethyl-2-ethyl-1,3-dioxacyclohexyl) methyl) 5-(2,5-dimethyl-2-ethyl-1,3-dioxacyclohexyl) methane phosphonate;

bis (5- (2,5-dimethyl-2-ethyl-1,3-dioxacyclohexyl) methyl) ethane phosphonate;
methyl-5-(2,5-dimethyl-2-ethyl-1,3-dioxacyclohexyl) methane phosphonate;
bis (5- (2,5-dimethyl-2-ethyl-1,3-dioxacyclohexyl) methyl) ethane phosphonate;
methyl-5-(2,5-dimethyl-2-ethyl-1,3-dioxacyclohexyl) methane phosphonate;
bis-(5-(2,5-dimethyl-2-ethyl-1,3-dioxacyclohexyl) methyl) dodecane phosphonate;
bis (5-(2,5-dimethyl-2-ethyl-1,3-dioxacyclohexyl) methyl) propene phosphonate;
bis (5-(2,5-dimethyl-2-ethyl-1,3-dioxacyclohexyl) methyl) cyclopentane phosphonate;
butyl-(5-(2,2,5-trimethyl-1,3-dioxacyclohexyl) methyl) butane phosphonate;
bis (5-(2,2,5-trimethyl-1,3-dioxacyclohexyl) methyl) butane phosphonate;
bis (5-(2,2,5-trimethyl-1,3-dioxacyclohexyl) methyl) propane phosphonate;
bis (4-(2,2-dimethyl-1,3-dioxacyclopentyl) methyl) 4-(2,2-dimethyl-1,3-dioxacyclopentyl) methane phosphonate $$\left[ CH_2-CH-CH_2-\overset{O}{\underset{\|}{P}}-\underset{O}{\underset{\diagdown C \diagup}{\overset{O}{\diagup}}}\left[ OCH_2-\overset{H}{\underset{|}{C}}-CH_2 \atop \underset{O}{\underset{\diagdown C \diagup}{\overset{O}{\diagup}}} \right]_2 \right]$$
$$\phantom{xxxxxxxxxx}CH_3\phantom{x}CH_3\phantom{xxxxx}CH_3\phantom{x}CH_3$$

bis (4-(2,2-dimethyl-1,3-dioxacyclopentyl) methyl) methane phosphonate;
bis (4-(2,2-dimethyl-1,3-dioxacyclopentyl) methyl) octadecane phosphonate;
bis (4-(2,2-dimethyl-1,3-dioxacyclopentyl) methyl) isobutane phosphonate;
bis (4-(1,3-dioxacyclopentyl) methyl) ethane phosphonate;
bis (4-(1,3-dioxacyclopentyl) methyl) 4-(1,3-dioxacyclopentyl) methane phosphonate;
octadecyl 4-(1,3-dioxacyclopentyl) methyl) octadecane phosphonate;
bis (4-(2-methyl-1,3-dioxacyclopentyl) methyl) 4-(2-methyl-1,3-dioxacyclopentyl) methane phosphonate;
bis (4-(2-methyl-1,3-dioxacyclopentyl) methyl) ethane phosphonate;
bis (4-(2-ethyl-1,3-dioxacyclopentyl) methyl)4-(2-ethyl-1,3-dioxacyclopentyl) methane phosphonate;
bis (4-(2-ethyl-1,3-dioxacyclopentyl) methyl) methane phosphonate;
oleyl 4-(2-ethyl-1,3-dioxacyclopentyl) methyl Δ⁹-octadecene phosphonate;
bis (4-(2-propyl-1,3-dioxacyclopentyl) methyl) 4-(2-propyl-1,3-dioxacyclopentyl) methane phosphonate;
bis (4-(2-propyl-1,3-dioxacyclopentyl) methyl) phenylmethane phosphonate;
bis (4-(2-propyl-1,3-dioxacyclopentyl) methyl) decane phosphonate;
bis (4-(2-heptadecyl-1,3-dioxacyclopentyl) methyl) ethane phosphonate;
bis (4-(2-heptadecenyl-1,3-dioxacyclopentyl) methyl) methane phosphonate;
bis (4-(2-vinyl-1,3-dioxacyclopentyl) methyl)-4-(2-vinyl-1,3-dioxacyclopentyl) methane prosphonate;
bis (4-(2-vinyl-1,3-dioxacyclopentyl) methyl) pentane phosphonate;
bis (4-(2-phenyl-1,3-dioxacyclopentyl) methyl) dodecane phosphonate;
bis (4-(2-p-methylphenyl-1,3-dioxacyclopentyl) methyl) octane phosphonate;
bis (4-(2-o-chlorophenyl-1,3-dioxacyclopentyl) methyl) octadecane phosphonate;
bis (4-(2-m-nitrophenyl-1,3-dioxacyclopentyl) methyl) ethane phosphonate;

bis (4-(2-bromophenyl-1,3-dioxacyclopentyl) methyl)
(4-(2-bromophenyl-1,3-dioxacyclopentyl) methyl)
4-(2-bromophenyl-1,3-dioxacyclopentyl) methane
phosphonate;
bis (4-(2-methyl-2-propyl-1,3-dioxacyclopentyl) methyl)
4-(2-methyl-2-propyl-1,3-dioxacyclopentyl) methane
phosphonate;
bis (4-(2-methyl-2-propyl-1,3-dioxacyclopentyl) methyl)
decane phosphonate;
bis (4-(2,2-diethyl-1,3-dioxycyclopentyl) methyl)
4-(2,2-diethyl-1,3-dioxacyclopentyl) methane
phosphonate;
amyl (4-(2,2-diethyl-1,3-dioxacyclopentyl) methyl)
pentane phosphonate;
bis (4-(2-methyl-2-butyl-1,3-dioxacyclopentyl) methyl)
methane phosphonate;
bis (4-(2-ethyl-2-propyl-1,3-dioxacyclopentyl) methyl)
(4-(2-ethyl-2-propyl-1,3-dioxacyclopentyl) methyl)
4-(2-ethyl-2-propyl-1,3-dioxacyclopentyl) methane
phosphonate;
bis (4-(2-ethyl-2-propyl-1,3-dioxacyclopentyl) methyl)
methane phosphonate;
bis (4-(2,2-dipropyl-1,3-dioxacyclopentyl) methyl)
ethane phosphonate;
bis (4-2,2-diheptadecyl-1,3-dioxacyclopentyl)methyl)
4-(2,2-diheptadecyl-1,3-dioxacyclopentyl) methane
phosphonate;
bis (4-(2,2-diheptadecyl-1,3-dioxacyclopentyl) methyl)
butane phosphonate;
bis (3-(1,4-dioxaspiro (5,5) decyl) methyl) 3-(1,4-dioxaspiro (5,5) decyl) methane phosphonate;
bis (3-(1,4-dioxaspiro (5,5) decyl) methyl) butane
phosphonate;
bis (3-(1,4-dioxaspiro (5,5) nonyl) methyl) methane
phosphonate;
bis (4-(2,2-diphenyl-1,3-dioxacyclopentyl) methyl)
4-(2,2-diphenyl-1,3-dioxacyclopentyl) methane
phosphonate;
bis (4-(2,2-diphenyl-1,3-dioxacyclopentyl) methyl)
octane phosphonate;
bis (4-(2-methyl-2-phenyl-1,3-dioxacyclopentyl) methyl)
4-(2-methyl-2-phenyl-1,3-dioxacyclopentyl)
methane phosphonate;
bis (4-(2-methyl-2-phenyl-1,3-dioxacyclophenyl)
methyl) methane phosphonate;
bis (4-(2,2-dimethyl-1,3-dioxacyclopentyl) propoxymethyl)ethane phosphonate

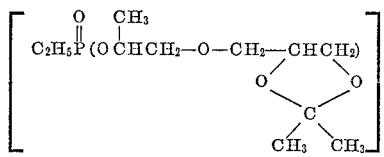

bis (4-(2-methyl-2-ethyl-1,3-dioxacyclopentyl) polyethoxymethyl) methane phosphonate (when the polyethoxy radical contains 30 ethoxy groups);
bis (4(2,2-dimethyl-1,3-dioxacyclopentyl) butyl)
4-(2,2-dimethyl-1,3-dioxacyclopentyl) butane phosphonate;
bis (4-(2,2-dimethyl-1,3-dioxacyclopentyl) butyl)
decane phosphonate;
ethyl-4 (1,3-dioxacyclopentyl) butyl ethane phosphonate;
bis (4-(2-methyl-1,3-dioxacyclopentyl) butyl) methane
phosphonate;
bis (4-(2-methyl-2-ethyl-1,3-dioxacyclopentyl) butyl)
hexane phosphonate;
bis (4-(1,3-dioxacyclopentyl) butyl) 4-(1,3-dioxacyclopentyl) butane phosphonate;
bis (4(1,3-dioxacyclopentyl) butyl) methane
phosphonate;
bis (4-(2-methyl-1,3-dioxacyclopentyl ethane
phosphonate;
bis (4-(2,2-dimethyl-1,3-dioxacyclopentyl) butyl)
phenyl-methane phosphonate;
bis (4-(2,2-diphenyl-1,3-dioxacyclopentyl) butyl)
heptane phosphonate;
bis (4-(2,2,5-trimethyl-1,3-dioxacyclopentyl) methyl)
4-(2,2,5-trimethyl-1,3-dioxacyclopentyl) methane
phosphonate;
bis (4-(2,2,5-trimethyl-1,3-dioxacyclopentyl) methyl)
propane phosphonate;
bis (4-(2,2-dimethyl-5-ethyl-1,3-dioxacyclopentyl)
methyl) butane phosphonate;
bis (4-(2,4,5-trimethyl-2-ethyl-1,3-dioxacyclopentyl)
methyl) methane phosphonate;
bis (5-(2,5-dimethyl-1,3-dioxacyclohexyl) methyl)
decane phosphonate;
bis (5-(2-methyl-2,5-diethyl-1,3-dioxacyclohexyl)
methyl) butane phosphonate;
amyl-(5(2-methyl-2,5-diethyl-1,3-dioxacyclohexyl)
methyl) pentane phosphonate;
bis (5-(2,2-dimethyl-5-propyl-1,3-dioxacyclohexyl)
methyl) ethane phosphonate;
bis (5-(2,2-dimethyl-5-heptadecyl-1,3-dioxacyclohexyl)
methyl) propene phosphonate;
bis (5-(5-methyl-1,3-dioxacyclohexyl) methyl) 5-5-methyl-1,3-dioxacyclohexyl) methane phosphonate;
bis (5-(5-methyl-1,3-dioxacyclohexyl) methyl)
hexadecane phosphonate;
bis (5-(5-ethyl-1,3-dioxacyclohexyl) methyl) 5-(5-ethyl-1,3-dioxacyclohexyl) methane phosphonate;
bis(5-(5-ethyl-1,3-dioxacyclohexyl) methyl) dodecane
phosphonate;
bis (5-(2,5-dimethyl-1,3-dioxacyclohexyl) methyl)
5-(2,5-dimethyl-1,3-dioxacyclohexyl) methane
phosphonate;
bis ((5-(2,5-dimethyl-1,3-dioxacyclohexyl) methyl)
ethane phosphonate;
bis (5-(2-methyl-5-ethyl-1,3-dioxacyclohexyl) methyl)
5-(2-methyl-5-ethyl-1,3-dioxacyclohexyl) methane
phosphonate;
bis (5-(2-methyl-5-ethyl-1,3-dioxacyclohexyl) methyl)
ethane phosphonate;
bis (5-(2-isobutyl-5-ethyl-1,3-dioxacyclohexyl) methyl)
methane phosphonate;
bis (5-(2-phenyl-5-ethyl-1,3-dioxacyclohexyl) methyl)
propanephosphonate;
methyl 5-(2,2-dimethyl-5-ethyl-1,3-dioxacyclohexyl)
methyl methane phosphonate;
bis (5-(2,2,5-trimethyl-1,3-dioxacyclohexyl) methyl)
5-(2,2,5-trimethyl-1,3-dioxacyclohexyl) methane
phosphonate;
bis (5-(2,2,5-trimethyl-1,3-dioxacyclohexyl) methyl)
propane phosphonate;
bis (5-(2-methyl-2-phenyl-5-ethyl-1,3-dioxacyclohexyl)
methyl) methane phosphonate;
bis (5-(2,5-dimethyl-2-phenyl-1,3-dioxacyclohexyl)
methyl) ethane phosphonate;
bis (5-(2,2-diethyl-5-methyl-1,3-dioxacyclohexyl)
methyl) 5-(2,2-diethyl-5-methyl-1,3-dioxacyclohexyl)
methane phosphonate;
bis (5-(2,2-diethyl-5-methyl-1,3-dioxacyclohexyl)
methyl) octadecane phosphonate;
bis (3-(3-methyl-1,5-dioxaspiro (6,6) undecyl) methyl
3-(methyl-1,5-dioxaspiro (6,6) undecyl) methane
phosphonate;
bis (3-(3-methyl-1,5-dioxaspiro (6,6) undecyl) methyl)
pentane phosphonate;
bis (3-(3-ethyl-1,5-dioxaspiro(6,6) undecyl) methyl)
3-(3-ethyl-1,5-dioxaspiro (6,6) undecyl methane
phosphonate;
bis (3-(3-ethyl-1,5-dioxaspiro (6,6) undecyl) methyl)
butane phosphonate;
bis (5-(2-cyclohexyl-5-methyl-1,3-dioxacyclohexyl)
methyl) ethane phosphonate;
bis (5-(2,2-diamyl-5-ethyl-1,3-dioxacyclohexyl) methyl)
methane phosphonate;
bis (5-(2,2-dimethyl-5-phenyl-1,3-dioxacyclohexyl)
methyl) methane phosphonate.

Illustrative examples of starting phosphites (which can be prepared in the manner set forth in the parent application) useful for preparing the phosphonates of Formula II are phosphites having the formula

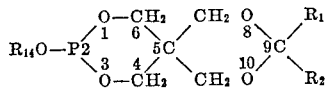

where $R_{14}$ is aralkyl, alkyl, alkenyl, aryl, haloaryl or nitroaryl and $R_1$ and $R_2$ are as defined above. While these compounds are called herein 1,3,8,10-tetraoxa-2-phospha-spiro (5,5) undecanes, they can also be named as 2,4,8,10-tetroxa-3-phospha-spiro (5,5) undecanes. Examples of such phosphites include 2-(phenoxy)-9-methyl-9-ethyl-1,3,8,10-tetroaxa-2-phospha-spiro (5,5) undecane;
2-(methoxy)-9-methyl-9-ethyl-1,3,8,10-tetraoxa-2-phospha-spiro (5,5) undecane;
2-(octadecoxy)-9-methyl-9-ethyl-1,3,8,10-tetraoxa-2-phospha-spiro (5,5) undecane;
2-(allyloxy)-9-methyl-9-ethyl-1,3,8,10-tetraoxa-2-phospha-spiro (5,5) undecane;
2-(oleyloxy)-9-methyl-9-ethyl-1,3,8,10-tetraoxa-2-phospha-spiro (5,5) undecane;
2-(benzyloxy)-9-methyl-9-ethyl-1,3,8,10-tetraoxa-2-phospha-spiro (5,5) undecane;
2-(p-dodecylbenzyloxy)9-methyl-9-ethyl-1,3,8,10-tetraoxa-2-phospha-spiro (5,5) undecane;
2-(decoxy)-9-methyl-9-ethyl-1,3,8,10-tetraoxa-2-phospha-spiro (5,5) undecane;
2-(cyclohexoxy)-9-methyl-9-ethyl-1,3,8,10-tetraoxa-2-phospha-spiro (5,5) undecane;
2-(butoxy)-9,9-dimethyl-1,3,8,10-tetraoxa-2-phospha-spiro (5,5) undecane;
2-(methoxy)-9,9-dimethyl-1,3,8,10-tetraoxa-2-phospha-spiro (5,5) undecane;
2-(amyloxy)-1,3,8,10-tetraoxa-2-phospha-spiro (5,5) undecane;
2-(octadecoxy)-1,3,8,10-tetraoxa-2-phospha-spiro (5,5) undecane;
2-(ethoxy)-9-methyl-1,3,8,10-tetraoxa-2-phospha-spiro (5,5) undecane;
2-(oleyloxy)-9-ethyl-1,3,8,10-tetraoxa-2-phospha-spiro (5,5) undecane;
2-(decoxy)-9-propyl-1,3,8,10-tetraoxa-2-phospha-spiro (5,5) undecane;
2-(isopropoxy)-9-isopropyl-1,3,8,10-tetraoxa-2-phospha-spiro (5,5) undecane;
2-(methoxy)-9-heptadecyl-1,3,8,10-tetraoxa-2-phospha-spiro (5,5) undecane;
2-(ethoxy)-9-heptadecyl-1,3,8,10-tetraoxa-2-phospha-spiro (5,5) undecane;
2-(dodecoxy)-9-vinyl-1,3,8,10-tetraoxa-2-phospha-spiro (5,5) undecane;
2-(octoxy)-9-phenyl-1,3,8,10-tetraoxa-2-phospha-spiro (5,5) undecane;
2-(hexadecoxy)-9-p-methylphenyl-1,3,8,10-tetraoxa-2-phospha-spiro (5,5) undecane;
2-(octadecoxy)-9-o-chlorophenyl-1,3,8,10-tetraoxa-2-phospha-spiro (5,5) undecane;
2-(ethoxy)-9-m-nitrophenyl-1,3,8,10-2-phospha-spiro (5,5) undecane;
2-(decoxy)-9-methyl-9-propyl-1,3,8,10-tetraoxa-2-phospha-spiro (5,5) undecane;
2-(pentoxy)-9,9-diethyl-1,3,8,10-tetraoxa-2-phospha-spiro (5,5) undecane;
2-(hexoxy)-9-methyl-9-butyl-1,3,8,10-tetraoxa-2-phospha-spiro (5,5) undecane;
2-(methoxy)-9-ethyl-9-propyl-1,3,8,10-tetraoxa-2-phospha-spiro (5,5) undecane;
2-(ethoxy)-9-methyl-9-t-butyl-1,3,8,10-tetraoxa-2-phospha-spiro (5,5) undecane;
2-(methoxy)-9,9-dipropyl-1,3,8,10-tetraoxa-2-phospha-spiro (5,5) undecane;
2-(dodecoxy)-9,9-diamyl-1,3,8,10-tetraoxa-2-phospha-spiro (5,5) undecane;
2-(ethoxy)-9,9-diheptadecyl-1,3,8,10-tetraoxa-2-phospha-spiro (5,5) undecane;
2-butoxy-1,3,8,10-tetraoxa-2-phospha-dispiro (5,5,9,9) hexadecane;
2-(octadecoxy)-1,3,8,10-tetraoxa-2-phospha-dispiro (5,5,9,9) pentadecane;
2-(octoxy)-9,9-diphenyl-1,3,8,10-tetraoxa-2-phospha-spiro-(5,5) undecane;
2-(methoxy)9-methyl-9-phenyl-1,3,8,10-tetraoxa-2-phospha-spiro (5,5) undecane;
2-(propoxy)-9,9-dimethyl-1,3,8,10-tetraoxa-2-phospha-spiro (5,5) undecane;
2-(ethoxy)-9-butyl-1,3,8,10-tetraoxa-2-phospha-spiro (5,5) undecane;
2-(methoxy)-9-cyclohexyl-1,3,8,10-tetraoxa-2-phospha-spiro (5,5) undecane.

Illustrative of phosphonates of the present invention within Formula II are 2-(methyl)-9-methyl-9-ethyl-1,3,8,10-tetraoxa-2-phosphono-spiro (5,5) undecane;

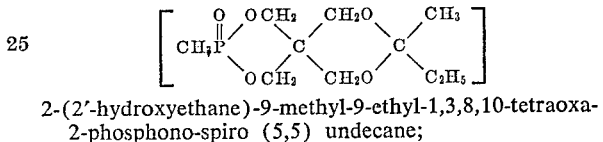

2-(2'-hydroxyethane)-9-methyl-9-ethyl-1,3,8,10-tetraoxa-2-phosphono-spiro (5,5) undecane;
2-(2'-hydroxypropane)-9,9-dimethyl-1,3,8,10-tetraoxa-2-phosphono-spiro (5,5) undecane;
2-(epoxypropane)-9,9-dimethyl-1,3,8,10-tetraoxa-2-phosphono-spiro (5,5) undecane;
2-(octadecane)-9-methyl-9-ethyl-1,3,8,10-tetraoxa-2-phosphono-spiro (5,5) undecane;
2-(propene)-9-methyl-9-ethyl-1,3,8,10-tetraoxa-2-phosphono-spiro (5,5) undecane;
2($\Delta^9$-octadecane)-9-methyl-9-ethyl-1,3,8,10-tetraoxa-2-phosphono-spiro (5,5) undecane;
2-(phenylmethane)-9-methyl-9-ethyl-1,3,8,10-tetraoxa-2-phosphono-spiro (5,5) undecane;
2-(p-dodecylphenylmethane)-9-methyl-9-ethyl-1,3,8,10-tetraoxa-2-phosphono-spiro (5,5) undecane;
2-(decane)-9-methyl-9-ethyl-1,3,8,10-tetraoxa-2-phosphono-spiro (5,5) undecane;
2-(cyclohexane)-9-methyl-9-ethyl-1,3,8,10-tetraoxa-2-phosphono-spiro (5,5) undecane;
2-(butane)-9,9-dimethyl-1,3,8,10-tetraoxa-2-phosphono-spiro (5,5) undecane;
2-(methane)-9,9-dimethyl-1,3,8,10-tetraoxa-2-phosphono-spiro (5,5) undecane;
2-(pentane)-1,3,8,10-tetraoxa-2-phosphono-spiro (5,5) undecane;
2-(octadecane)-1,3,8,10-tetraoxa-2-phosphono-spiro (5,5) undecane;
2-(ethane)-9-methyl-1,3,8,10-tetraoxa-2-phosphono-spiro (5,5) undecane;
2($\Delta^9$-octadecane)-9-ethyl-1,3,8,10-tetraoxa-2-phosphono-spiro (5,5) undecane;
2-(decane)-9-propyl-1,3,8,10-tetraoxo-2-phosphono-spiro (5,5) undecane;
2-(1-methylethane)-9-isopropyl-1,3,8,10-tetraoxa-2-phosphono-spiro (5,5) undecane;
2-(methane)-9-heptadecyl-1,3,8,10-tetraoxa-2-phosphono-spiro (5,5)undecane;
2-(dodecane)-9-vinyl-1,3,8,10-tetraoxa-2-phosphono-spiro (5,5) undecane;
2-(ethane)-9-heptadecenyl-1,3,8,10-tetraoxa-2-phosphono-spiro (5,5) undecane;
2-(octane)-9-phenyl-1,3,8,10-tetraoxa-2-phosphono-spiro (5,5) undecane;
2-(hexadecane)-9-p-methylphenyl-1,3,8,10-tetraoxa-2-phosphono-spiro (5,5) undecane;
2-(octadecane)-9-o-chlorophenyl-1,3,8,10-tetraoxa-2-phosphono-spiro (5,5) undecane;

2-(ethane)-9-m-nitrophenyl-1,3,8,10-tetraoxa-2-phosphono-spiro (5,5) undecane;
2-(decane)-9-methyl-9-propyl-1,3,8,10-tetraoxa-2-phosphono-spiro (5,5) undecane;
2-(pentane)-9,9-diethyl-1,3,8,10-tetraoxa-2-phosphono-spiro (5,5) undecane;
2-(hexane)-9-methyl-9-butyl-1,3,8,10-tetraoxa-2-phosphono-spiro (5,5) undecane;
2-(methane)-9-ethyl-9-propyl-1,3,8,10-tetraoxa-2-phosphono-spiro (5,5) undecane;
2-(ethane)-9-methyl-9-butyl-1,3,8,10-tetraoxa-2-phosphono-spiro (5,5) undecane;
2-(methane)-9,9-dipropyl-1,3,8,10-tetraoxa-2-phosphono-spiro (5,5) undecane;
2-(decane)-9,9-diamyl-1,3,8,10-tetraoxa-2-phosphono-spiro (5,5) undecane;
2-(ethane)-9,9-diheptadecyl-1,3,8,10-tetraoxa-2-phosphono-spiro (5,5) undecane;
2-(butane)-1,3,8,10-tetraoxa-2-phosphono-dispiro (5,5,9,9) hexadecane

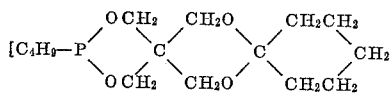

2-(octadecane)-1,3,8,10-tetraoxa-2-phosphono-dispiro (5,5,9,9) pentadecane;
2-(octane)-9,9-diphenyl-1,3,8,10-tetraoxa-2-phosphono-spiro (5,5) undecane;
2-(methane)-9-methyl-9-phenyl-1,3,8,10-tetraoxa-2-phosphono-spiro (5,5) undecane;
2-(propane)-9,9-dimethyl-1,3,8,10-tetraoxa-2-phosphono-spiro (5,5) undecane;
2-(ethane)-9-butyl-1,3,8,10-tetraoxa-2-phosphono-spiro (5,5) undecane;
2-(methane)-9-cyclohexyl-1,3,8,10-tetraoxa-2-phosphono-spiro (5,5) undecane.

Illustrative examples of starting phosphites (which can be prepared in the manner set forth in the parent application) useful for preparing the phosphonates of Formulae III and IV are 2,2-bis (diphenoxyphosphaoxybutoxy) propane;
2,2-bis (dimethoxyphosphabutoxy) propane;
2,2-bis (didecoxyphosphaoxybutoxy) propane;
2,2-bis (phenoxydecoxyphosphaoxybutoxy) propane;
2,2-bis (dioctadecoxyphosphaoxybutoxy) propane;
2,2-bis (di-oleyloxyphosphaoxybutoxy) propane;
2,2-bis (di-cyclohexoxyphosphaoxybutoxy) propane;
2,2-bis (di-allyloxyphosphaoxybutoxybutoxy) propane;
2,2-bis (di-benzyloxyphosphaoxybutoxy) propane;
2,2-bis (di-butoxyphosphaoxybutoxy) butane;
2,2-bis (di-ethoxyphosphaoxypentoxy) butane;
2,2-bis (dimethoxyphosphaoxydecoxy) butane;
2,2-bis (dioctoxyphosphaoxydecosanoxy) butane;
2,2-bis (diethoxyphosphaoxyhexoxy) butane;
bis (di-octadecoxyphosphaoxybutoxy) methane;
bis (di-dodecycloxyphosphaoxypentoxy) methane;
bis (dimethoxyphosphaoxydecoxy) methane;
1,1-bis (diethoxyphosphaoxybutoxy) ethane;
1,1-bis (dipropoxyphosphaoxydecoxy) ethane;
1,1-bis (dioleyloxyphosphaoxybutoxy) propane;
1,1-bis (dipentoxyphosphaoxydecoxy) propane;
1,1-bis (dioleyloxyphosphaoxypentoxy) propane;
1,1-bis (didecoxyphosphaoxybutoxy) butane;
1,1 - bis (dicyclohexoxyphosphaoxybutoxy) - 2-methylpropane;
1,1-bis (dimethoxyphosphaoxybutoxy) dodecane;
1,1-bis (diisopropoxyphosphaoxydecoxy) dodecane;
1,1-bis (dimethoxyphosphaoxybutoxy) octadecane;
1,1-bis (diethoxyphosphaoxydecoxy) octadecane;
bis (dibutoxyphosphaoxybutoxy) (phenyl) methane;
1,1-bis (di-dodecoxyphosphaoxybutoxy) propene-2;
1,1-bis (diethoxyphosphaoxydecoxy) propene-2;
1,1-bis (dipropoxyphosphaoxybutoxy) butene-2;
1,1-bis (dimethoxyphosphaoxybutoxy) octadecene-9;
1,1-bis (dihexoxyphosphaoxybutoxy) (cyclohexyl) methane;
bis (dioctoxyphosphaoxybutoxy) (phenyl) methane;
bis (dimethoxyphosphaoxypentoxy) (p - methylphenyl) methane;
bis (dioctadecoxyphosphaoxybutoxy) (o-chlorophenyl) methane;
bis (dimethoxyphosphaoxybutoxy) (m - nitrophenyl) methane;
2,2-bis (didecoxyphosphaoxybutoxy )pentane;
2,2-bis dimethoxy phosphapentoxy) pentane;
3,3-bis (dimethoxyphosphaoxybutoxy) pentane;
3,3-bis (dipentoxyphosphaoxydecoxy) pentane;
2,2-bis (dimethoxyphosphaoxypentoxy) hexane;
3,3-bis (diethoxyphosphaoxybutoxy) hexane;
2,2-bis (dimethoxyphosphaoxybutoxy) 3,3-dimethylbutane;
4,4-bis (dipropoxyphosphaoxyhexoxy) heptane;
6,6-bis (dihexadecoxyphosphaoxybutoxy) undecane;
18,18-bis (dimethoxyphosphaoxybutoxy) pentatricontane;
1,1-bis (dibutoxyphosphaoxybutoxy) cyclohexane;
1,1-bis (dimethoxyphosphaoxybutoxy) cyclopentane;
bis (dioctoxyphosphaoxybutoxy) (diphenyl) methane;
1,1-bis (dimethoxyphosphaoxyoctoxy) -1-phenylethane;
1,1-bis (dimethoxyphosphaoxybutoxy) -1-phenyl propane;
bis (dimethoxyphosphaoxyethoxyethoxy) methane;
1,1-bis (dipropoxyphosphaoxyethoxyethoxy) ethane;
1,1-bis (didecoxyphosphaoxyethoxyethoxy) butane;
2,2-bis (diethoxyphosphaoxyethoxyethoxy) propane;
2,2-bis (dimethoxyphosphaoxyethoxyethoxy) butane;
1,1-bis (dimethoxyphospha-2'-oxypropoxypropoxy) ethane;
2,2-bis (dibutoxyphospha-2'-oxypropoxypropoxy) propane;
2,2-bis (dipentoxyphospha-2'-oxypropoxypropoxy) butane;
2,2 - bis (dimethoxyphosphaoxypolyethoxy) propane (where the polyethoxy group has a molecular weight of 2000);
2,2-bis (dioctoxyphosphaoxypolypropoxy) butane (where the polypropoxy group has a molecular weight of 1000);
1,1-bis (diethoxyphosphaoxybutoxybutoxy) cyclohexane;
bis (dimethoxyphosphaoxyethoxyethoxyethoxy) (phenyl) methane.

Illustrative of phosphonates of the present invention within Formulae III and IV are 2,2-bis[(methoxy)(methanephosphonobutoxy)]propane $$CH_3-\overset{O}{\underset{CH_3O}{\overset{\|}{P}}}-OC_4H_9O\overset{CH_3}{\underset{CH_3}{\overset{|}{C}}}OC_4H_9O\overset{O}{\underset{OCH_3}{\overset{\|}{P}}}-CH_3$$

2,2-bis((methoxy)2'-hydroxyethanephosphonobutoxy) propane;
2,2-bis((methoxy)2'-hydroxypropanephosphonobutoxy) propane;
2,2-bis((methoxy)epoxypropanephosphonobutoxy) propane;
2,2-bis((decoxy)decanephosphonobutoxy)propane;
2,2-bis((phenoxy)decane-phosphonobutoxy)propane;
2,2-bis((octadecoxy)octadecanephosphonobutoxy) propane;
2,2-bis((oleyloxy)Δ9-octadecenephosphonobutoxy) propane;
2,2-bis((cyclohexoxy)cyclohexanephosphonobutoxy) propane;
2,2-bis((allyloxy)propenephosphonobutoxy)propane;
2,2-bis((benzyloxy)phenylmethanephosphonobutoxy) propane;
2,2-bis((butoxy)butanephosphonobutoxy)butane;
2,2-bis((ethoxy)ethanephosphonopentoxy)butane;
2,2-bis((methoxy)methane phosphonodecoxy)butane;
2,2-bis((octoxy)octanephosphonoeicosanoxy)butane;

2,2-bis((ethoxy)ethanephosphonohexoxy)butane;
bis((octadecoxy)octadecanephosphonobutoxy)methane;
bis((dodecyloxy)dodecanephosphonopentoxy)methane;
bis(methoxy)methanephosphonodecoxy)methane;
1,1-bis((ethoxy)ethanephosphonobutoxy)ethane;
1,1-bis((propoxy)propanephosphonodecoxy)ethane;
1,1-bis((oleyloxy)Δ⁹-octadecenephosphonobutoxy)propane;
1,1-bis((pentoxy)pentanephosphonodecoxy)propane;
1,1-bis((oleyloxy)Δ⁹-octadecenephosphonopentoxy)propane;
1,1-bis((decoxy)decanephosphonobutoxy)butane;
1,1-bis((cyclohexoxy)cyclohexanephosphono-butoxy-2-methylpropane;
1,1-bis((methoxy)methanephosphonobutoxy)dodecane;
1,1-bis((isopropoxy)isopropanephosphonodecoxy)dodecane;
1,1-bis((methoxy)methanephosphonobutoxy)octadecane;
1,1-bis((ethoxy)ethanephosphonodecoxy)octadecane;
bis((butoxy)butanephosphonobutoxy)(phenyl)methane;
1,1-bis((dodecoxy)dodecanephosphonobutoxy)propane-2;
1,1-bis((ethoxy)ethanephosphonodecoxy)propene-2;
1,1-bis((propoxy)propanephosphonobutoxy)butene-2;
1,1-bis((methoxy)methanephosphonobutoxy)octadecene-9;
1,1-bis(hexoxy)hexanephosphonobutoxy)(cyclohexyl)methane;
bis((octoxy)octanephosphonobutoxy)(phenyl)methane;
bis((methoxy)methanephosphonopentoxy)(p-methylphenyl)methane;
bis((octadecoxy)octadecanephosphonobutoxy)(o-chlorophenyl)methane;
bis((methoxy)methanephosphonobutoxy)(m-nitrophenyl)methane;
2,2-bis((decoxy)decanephosphonobutoxy)pentane;
2,2-bis((methoxy)methanephosphonopentoxy)pentane;
3,3-bis((methoxy)methanephosphonobutoxy)pentane;
3,3-bis((pentoxy)pentanephosphonodecoxy)pentane;
2,2-bis((methoxy)methanephosphonopentoxy)hexane;
3,3-bis((ethoxy)ethanephosphonobutoxy)hexane;
2,2-bis((methoxy)methanephosphonobutoxy)3,3-dimethylbutane;
4,4-bis((propoxy)propanephosphonoxhexoxy)heptane;
6,6-bis((hexadecoxy)hexadecanephosphonobutoxy)undecane;
18,18-bis((methoxy)methanephosphonobutoxy)pentatricontane;
1,1-bis((butoxy)butanephosphonobutoxy)cyclohexane;
1,1-bis((methoxy)methanephosphonobutoxy)cyclopentane;
bis((octoxy)octanephosphonobutoxy)(diphenyl)methane;
1,1-bis((methoxy)methanephosphonooctoxy)-1-phenylethane;
1,1-bis((methoxy)methanephosphonobutoxy)-1-phenylpropane;
bis((methoxy)methanephosphonoethoxyethoxy)methane;
1,1-bis((propoxy)propanephosphonoethoxyethoxy)ethane;
1,1-bis((decoxy)decanephosphonoethoxyethoxy)butane;
2,2-bis((ethoxy)ethanephosphonoethoxyethoxy)propane;
2,2-bis((methoxymethanephosphonoethoxyethoxy)butane;
1,1-bis((methoxy)methanephosphonoisopropoxyisopropoxy)ethane;
2,2-bis((butoxy)butanephosphonoisopropoxyisopropoxy)propane;
2,2-bis((pentoxy)pentanephosphonoisopropoxyisopropoxy)butane;
2,2-bis((methoxy)methanephosphonopolyethoxy)propane (where the polyethoxy group has a molecular weight of 2,000;

2,2-bis((octoxy)octanephosphonopolypropoxy)butane (where the polypropoxy group has a molecular weight of 1000);
1,1-bis((ethoxy)ethanephosphonobutoxybutoxy) cyclohexane;
bis((methoxy)methanephosphonoethoxyethoxy-ethoxy)phenyl)methane.

Illustrative examples of starting phosphites (which can be prepared in the manner set forth in the parent application) useful for preparing the phosphonates of the Formula V are 5,6 monophenyl phosphite ester of 1,3,2,4-diisopropylidene sorbitol;
5,6-mono methyl phosphite ester of 1,3,2,4-diisopropylidene sorbital;
5,6-mono benzyl phosphite ester of 1,3,2,4-diisopropylidene sorbitol;
5,6-monodecyl phosphite ester of 1,3,2,4-diisopropylidene sorbitol;
5,6-mono octadecyl phosphosphite ester of 1,3,2,4-diisopropylidene sorbitol;
5,6-mono oleyl phosphite ester of 1,3,2,4-diisopropylidene sorbitol;
5,6-mono cyclohexyl phosphite ester of 1,3,2,4-diisopropylidene sorbitol;
5,6-mono butyl phosphite ester of 1,3,2,4-diethylidene sorbitol;
5,6-mono ethyl phosphite ester of 1,3,2,4-dibenzylidene sorbitol;
3,4-mono-allyl phosphite ester of 1,2,5,6-diisopropylidene mannitol;
3,4-mono hexadecyl phosphite ester of 1,2,5,6-diisopropylidene mannitol;
5,6-mono decyl phosphite ester of 1,3,2,4-dicyclohexylidene sorbitol;
5,6-mono methyl phosphite ester of 1,3,2,4-di-methylene sorbitol;
5,6-mono methyl phosphite ester of 1,3,2,4-di isobutylidene sorbitol;
3,4-mono amyl phosphite ester of 1,2,5,6-di benzylidene mannitol;
3,4-mono decyl phosphite ester of 1,2,5,6-di ethylidene mannitol;
5,6-mono cyclohexyl phosphite ester of 1,3,2,4-di n-butylidene sorbitol.

Illustrative of phosphonates of the present invention within Formula V are 5,6-methanephosphonate ester of 1,3,2,4-diisopropylidene sorbitol

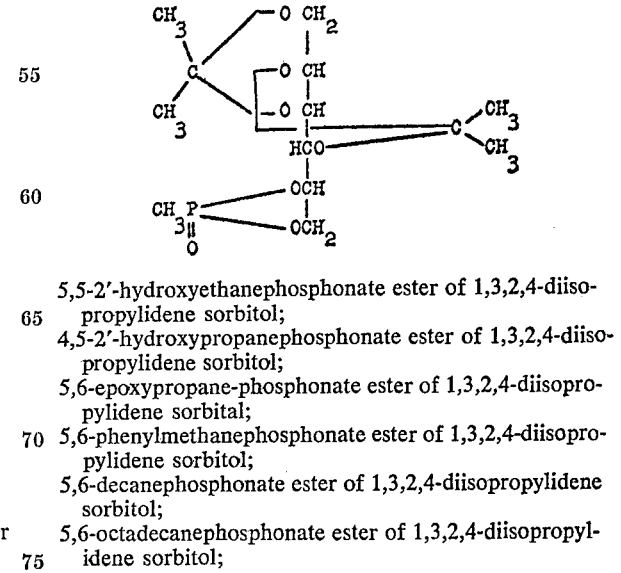

5,5-2'-hydroxyethanephosphonate ester of 1,3,2,4-diisopropylidene sorbitol;
4,5-2'-hydroxypropanephosphonate ester of 1,3,2,4-diisopropylidene sorbitol;
5,6-epoxypropane-phosphonate ester of 1,3,2,4-diisopropylidene sorbital;
5,6-phenylmethanephosphonate ester of 1,3,2,4-diisopropylidene sorbitol;
5,6-decanephosphonate ester of 1,3,2,4-diisopropylidene sorbitol;
5,6-octadecanephosphonate ester of 1,3,2,4-diisopropylidene sorbitol;

5,6-Δ⁹-octadecenephosphonate ester of 1,3,2,4-diisopropylidene sorbitol;
5,6-cyclohexanephosphonate ester of 1,3,2,4-diisopropylidene sorbital;
5,6-butanephosphonate ester of 1,3,2,4-diethylidene sorbitol;
5,6-ethanephosphonate ester of 1,3,2,4-dibenzylidene sorbitol;
3,4-propenephosphonate ester of 1,2,5,6-diisopropylidene mannitol;
3,4-hexadecanephosphonate ester of 1,2,5,6-diisopropylidene mannitol;
5,6-decanephosphonate ester of 1,3,2,4-dicyclohexylidene sorbitol;
5,6-methanephosphonate ester of 1,3,2,4-di-methylene sorbitol;
5,6-methanephosphonate ester of 1,3,2,4-di-isobutylidene sorbitol;
3,4-pentanephosphonate ester of 1,2,5,6-di-benzylidene mannitol;
3,4-decane phosphonate ester of 1,2,5,6-diethylidene mannitol;
1,5,6-cyclohexyanephosphonate ester of 1,3,2,4-di n-butylidene sorbitol.

Illustrative of phosphonates of the present invention within Formula VI are phenyl 2,3-dihydroxypropylmethylphosphonate

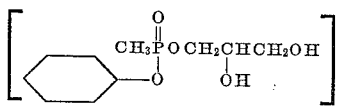

bis (2,3-dihydroxypropyl) methane phosphonate;
bis (2,3-dihydroxypropyl) 2-hydroxyethanephosphonate;
bis (2,3-dihydroxypropyl) 2-hydroxypropanephosphonate;
methyl 2,3-dihydroxypropyl methanephosphonate;
bis 2,3-dihydroxypropyl) ethanephosphonate;
bis (2,3-dihydroxypropyl) 2,3-dihydroxypropanephosphonate;
bis (2,3-dihydroxypropyl) decanephosphonate;
bis (2,3-dihydroxypropyl) octadecanephosphonate;
octadecyl 2,3-dihydroxypropyl octadecanephosphonate;
bis (2,3-dihydroxypropyl) Δ⁹-octadecanephosphonate;
bis (2,3-dihydroxypropyl) phenylmethanephosphonate;
bis (2,3-dihydroxypropyl) p-dodecylphenylmethanephosphonate;
bis (2,3-dihydroxypropyl) cyclohexanephosphonate;
bis (3-methyl-2-4-dihydroxybutyl) 3-methyl 2,4-dihydroxybutylphosphonate

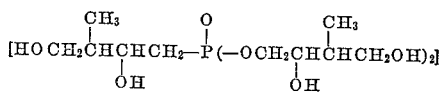

bis (3-methyl-2,4-dihydroxybutyl) ethanephosphonate;
methyl 3-methyl-2,4-dihydroxybutyl methylphosphonate

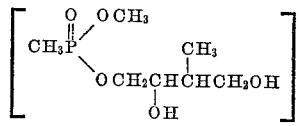

bis (3-methyl-2,4-dihydroxybutyl) dodecanephosphonate;
bis (3-methyl-2,4-dihydroxybutyl) propenephosphonate;
bis (3-methyl-2,4-dihydroxybutyl) cyclopentanephosphonate;
butyl 3-methyl-2,4-dihydroxybutyl butanephosphonate;
bis(3-methyl-2,4-dihydroxybutyl) butanephosphonate;
bis(3-methyl-2,4-dihydroxybutyl) propanephosphonate;
bis(2,3-dihydroxypropyl) isobutanephosphonate;

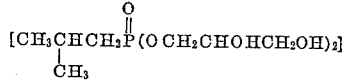

oleyl 2,3-dihydroxypropane Δ⁹-octadecenephosphonate;

bis(2,3-dihydroxypropyl) pentanephosphonate;
bis(2,3-dihydroxypropyl) dodecanephosphonate;
bis(2,3-dihydroxypropyl)octanephosphonate;
amyl 2,3-dihydroxypropyl pentanephosphonate;
bis(2,3-dihydroxypropyl) butanephosphonate;
bis(2,3-dihydroxypropoxy 1-methylethyl) ethylphosphonate

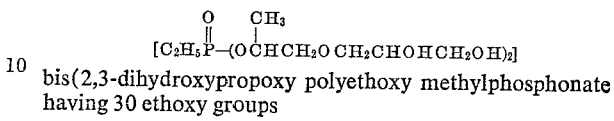

bis(2,3-dihydroxypropoxy polyethoxy methylphosphonate having 30 ethoxy groups

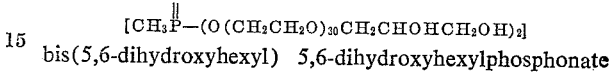

bis(5,6-dihydroxyhexyl) 5,6-dihydroxyhexylphosphonate

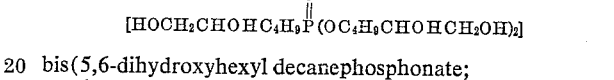

bis(5,6-dihydroxyhexyl) decanephosphonate;
ethyl 5,6-dihydroxyhexyl ethanephosphonate;
bis(5,6-dihydroxyhexyl) methanephosphonate;
bis(5,6-dihydroxyhexyl) hexanephosphonate;
bis(5,6-dihydroxyhexyl) phenylmethanephosphonate;
bis(5,6-dihydroxyhexyl) heptanephosphonate;
bis(2,3-dihydroxybutyl) 2,3-dihydroxybutanephosphonate;
bis(2,3-dihydroxybutyl) propanephosphonate;
bis(2,3-dihydroxyamyl) butanephosphonate;
bis(2-methyl-2,3-dihydroxybutyl) methanephosphonate;
bis(2,2-di(hydroxymethyl) propyl) decylphosphonate

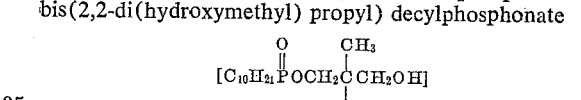

bis(2,2-di(hydroxymethyl) butyl) butanephosphonate;
amyl 2,2-di(hydroxymethyl) butyl pentylphosphonate

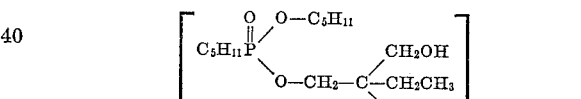

bis(2,2-di(hydroxymethyl) amyl) ethanephosphonate;
bis(2,2-di(hydroxymethyl)monadecyl) propenephosphonate;
bis(2,2-di(hydroxymethyl) propyl) 2,2-di(hydroxymethyl) propanephosphonate;
bis(2,2-di(hydroxymethyl) propyl) hexadecanephosphonate;
bis(2,2-di(hydroxymethyl) butyl) 2,2-di(hydroxymethyl) butanephosphonate;
bis(2,2-di(hydroxymethyl) butyl) dodecanephosphonate;
bis(2,2-di(hydroxymethyl) butyl) ethanephosphonate;
bis(2,2-di(hydroxymethyl) butyl) propanephosphonate;
methyl 2,2-di(hydroxymethyl) butyl methanephosphonate;
bis(2,2-di(hydroxymethyl) propyl) ethanephosphonate;
bis(2,2-di(hydroxymethyl) propyl) octadecanephosphonate;
bis(2,2-di(hydroxymethyl) propyl) pentanephosphonate;
bis(2,2-di(hydroxymethyl) butyl) butanephosphonate;
bis(2,2-di(hydroxymethyl) propyl) methanephosphonate;
bis(2-hydroxymethyl-2-phenyl-3-hydroxy propyl) methanephosphonate.

Illustrative of phosphonates of the present invention within Formula VII are 5,5-dihydroxymethyl-1,3-dioxa-2-methylphosphonocyclohexane

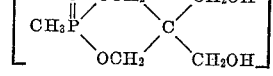

5,5-di(hydroxymethyl)-1,3-dioxa-2-(2'-hydroxyethane)
  phosphonocyclohexane;
5,5-di(hydroxymethyl)-1,3-dioxa-2-(2'-hydroxypropane)
  phosphonocyclohexane;
5,5-di(hydroxymethyl)-1,3-dioxa-2-octadecanephospho-
  nocyclohexane;
5,5-di(hydroxymethyl)-1,3-dioxa-2-propenephosphono-
  cyclohexane

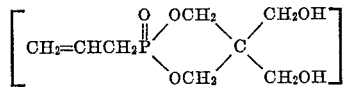

5,5-di(hydroxymethyl)-1,3-dioxa-2-Δ⁹ octadecenephos-
  phonocyclohexane;
5,5-di(hydroxymethyl)-1,3-dioxa-2-phenylmethanephos-
  phonocyclohexane;
5,5-di(hydroxymethyl)-1,3-dioxa-2-p-dodecylphenylene-
  ethanephosphonocyclohexane;
5,5-di (hydroxymethyl)-1,3-dioxa-2-decanephos-
  phonocyclohexane;
5,5-di (hydroxymethyl)-1,3-dioxa-2-cyclohexane-
  phosphonocyclohexane;
5,5-di (hydroxymethyl)-1,3-dioxa-2-butanephos-
  phonocyclohexane;
5,5-di (hydroxymethyl-1,3-dioxa-2-pentanephos-
  phonocyclohexane;
5,5-di (hydroxymethyl)-1,3-dioxa-2-ethanepos-
  phonocyclohexane;
5,5-di (hydroxymethyl)-1,3-dioxa-2-(1'-methyl)
  ethanephosphonocyclohexane;
5,5-di(hydroxymethyl) 1,3-dioxa-2-dodecanephos-
  phonocyclohexane;
5,5-di(hydroxymethyl)-1,3-dioxa-2-octanephos-
  phonocyclohexane;
5,5-di (hydroxymethyl)-1,3-dioxa-2-hexadecanephos-
  phonocyclohexane;
5,5-di(hydroxymethyl)-1,3-dioxa-2-hexanephos-
  phonocyclohexane;
5,5-di (hydroxymethyl)-1,3-dioxa-2-propanephos-
  phonocyclohexane.

Illustrative of phosphonates of the present invention within Formula VIII are 5,6-methanephosphonate ester of sorbitol;
5,6-(2'-hydroxy) ethane phosphonate ester of sorbitol;
5,6-(2'-hydroxy) propanephosphonate ester of sorbitol;
5,6-phenylmethanephosphonate ester of sorbitol;
5,6-decanephosphonate ester of sorbitol;
5,6-octadecanephosphonate ester of sorbitol;
5,6-Δ⁹-octadecenephosphonate ester of sorbitol;
5,6-butanephosphonate ester of sorbitol;
5,6-ethanephosphonate ester of sorbitol;
3,4-propenephosphonate ester of mannitol;
3,4-hexadecanephosphonate ester of mannitol;
3,4-pentanephosphonate ester of mannitol;
3,4-decanephosphonate ester of mannitol.

Unless otherwise indicated, all parts and percentages are by weight.

Example 1

8 moles of acetone, 2 moles of trimethylolethane, 400 grams of pentane and 6 grams of p-toluenesulfonic acid were mixed and heated at reflux and the water of reaction was collected in a Dean and Stark trap. Heating was continued until the theoretical amount of water had been removed. The product was 2,2,5-trimethyl-5-methylol-1,3-dioxacyclohexane, a colorless viscous liquid, yield 283 grams (88.2% of theory) B.P. 84–88° C./0.8 mm., showing significant infrared absorptions at 2.78(OH) and 9.22 (cyclic ether) microns.

Example 2

8 moles of methyl ethyl ketone, 4 moles of glycerine, 400 grams of hexane and 10 grams of p-toluene sulfonic acid were refluxed in the manner described in Example 1. From the reaction mixture was isolated 2-methyl-2-ethyl-5-methylol-1,3-dioxacyclopentane, a colorless liquid boiling at 63–67° C./0.3 mm., yield 485 grams (82.8% of theory), hydroxy value 382.7 (theory 383) having the formula

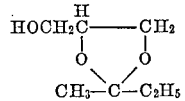

The product is also called 2-methyl-2-ethyl-4-methylol-1,3-dioxacyclopentane.

Example 3

2.1 moles of cyclohexanone, 2.0 moles of glycerine, 100 grams of toluene and 2 grams of 50% aqueous sulfuric acid were refluxed for 3 hours into a Dean and Stark trap during which time the theoretical amount of water was collected. The reaction mixture was neutralized with 2 grams of sodium carbonate, filtered and the solvent removed in vacuo. The product which was recovered by distillation was 2,2-pentamethylene-5-hydroxymethyl-1,3-dioxacyclopentane, a colorless liquid, B.P. 98–103° C./0.6 mm., $n_D^{20}$ 1.4780, showing strong infrared absorption at 2.78(OH) and 9.05 (ether) microns; yield 305 grams (88.5% of theory).

Example 4

6.0 moles of methyl ethyl ketone, 3.0 moles of 1,2,6-hexanetriol, 400 grams of hexane and 10 grams of p-toluenesulfonic acid were refluxed for 8 hours while collecting the water formed by the reaction in a Dean and Stark trap. From the reaction mixture was isolated 490 grams (86.7% yield) of 2-methyl-2-ethyl-5-(4-hydroxybutyl) 1,3-dioxacyclopentane, a colorless liquid B.P. 106–110° C./0.6 mm., hydroxyl value 294.5 (theory 298).

Example 5

1.0 mole of trimethyl phosphite and 2.0 moles of 2-methyl-2-ethyl-5(4-hydroxybutyl) - 1,3 - dioxacyclopentane. The ketal of Example 4 were heated with 1 gram of sodium methoxide for 1 hour at 80 to 140° C. (pot temperature) while allowing methanol to distill from the reaction mixture through a packed column. After vacuum stripping, the product was filtered to give 430 grams (98.5% of theory) of methyl bis(4-(2-methyl-2-ethyl-1,3-dioxacyclopentyl) butyl) phosphite a colorless liquid having the formula

Example 6

The procedure of Example 5 was repeated but utilizing 2.0 moles of 2,2-pentamethylene-5-hydroxymethyl-1,3-dioxacyclopentane (the ketal of Example 3) in place of the ketal of Example 4. The product was methyl bis-(3(1,4-dioxaspiro-(5,5)-decyl)methyl) phosphite, a colorless viscous liquid obtained in a yield of 96.3% and having the formula

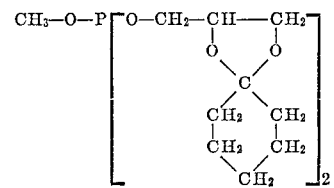

Example 7

The procedure of Example 5 was repeated but utilizing 2.0 moles of 2,2,5-trimethyl-5-methylol-1,3-dioxacyclohexane (the ketal of Example 1) in place of the ketal of Example 4. The product was methyl bis(5-(2,5-dimethyl-3-ethyl-1,3-dioxacyclohexyl)methyl)phosphite.

Example 8

The procedure of Example 5 was repeated but utilizing 2.0 moles of 2-methyl-2-ethyl-5-methylol-1,3-dioxacyclopentane (the ketal of Example 2) in place of the ketal of Example 4 and using 1 mole of trioctadecyl phosphite in place of the trimethyl phosphite. The product was octadecyl bis(4-(2-methyl-2-ethyl-1,3-dioxacyclopentyl)methyl)phosphite.

Example 9

200 grams of the methyl bis(4-(2-methyl-2-ethyl-1,3-dioxacyclopentyl)butyl phosphite (the ketal phosphite prepared in Example 5) was heated for 7 hours at 140–150° C. with one gram of ethyl iodide as a catalyst. The conversion to phosphonate was followed by periodic sampling and titration with 0.1 N iodine in benzene during the heating period. All of the phosphite was converted after the 7 hours of heating. After vacuum stripping, there was obtained as the product in a yield of 99.4% bis(4-(2 - methyl - 2 - ethyl - 1,3 - dioxacyclopentyl)butyl) methylphosphonate as a colorless liquid having the structure:

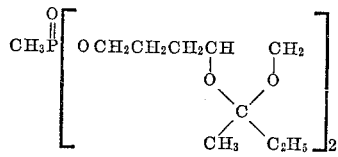

There was a slight impurity of bis(4-(2-methyl-2-ethyl-1,3-dioxacyclopentyl)butyl)ethane-phosphonate. In another run by using methyl iodide rather than ethyl iodide as the catalyst the impurity was completely eliminated.

Example 10

The procedure of Example 9 was repeated replacing the ketal phosphite of Example 5 with 200 grams of methyl bis(3(1,4 - dioxaspiro(5,5)decyl)methyl)phosphite (the ketal phosphite of Example 6) and using 1 gram of ethyl iodide as a catalyst. The product was bis(3(1,4-dioxaspiro(5,5)decyl)methyl)methane phosphonate, a viscous slightly yellow liquid having the formula

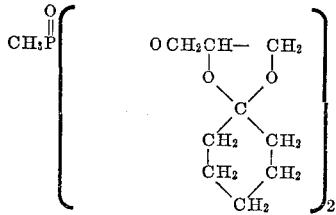

Example 11

The procedure of Example 10 was repeated replacing the ketal phosphite of Example 6 with 200 grams of methyl bis(5(2,5 - dimethyl-2-ethyl-,1,3-dioxacyclohexyl) methyl)phosphite and using 1 gram of methyl iodide as the catalyst. The product was bis(5(2,5-dimethyl-2-ethyl-1,3-dioxacyclohexyl)methyl)methanephosphonate.

Example 12

The procedure of Example 9 was repeated replacing the ketal phosphite of Example 5 with 200 grams of octadecyl bis(4-(2-methyl-2-ethyl-1,3-dioxacyclopentyl)methyl)phosphite and using 1 gram of octadecyl bromide as the catalyst. The product was bis(4-(2-methyl-2-ethyl-1,3-dioxacyclopentyl)methyl)octadecanephosphonate.

Example 13

The procedure of Example 9 was repeated replacing the ketal phosphite of Example 5 by 2-methoxy-9-methyl-9 - ethyl - 1,3,8,10 - tetraoxa - 2 - phosphaspiro(5,5) undecane and using 1 gram of methyl iodide as the catalyst. The product was 2-(methane)-9-methyl-9-ethyl-1,3,8,10-tetraoxa-2-phosphonospiro(5,5)undecane.

Example 14

The procedure of Example 9 was repeated replacing the ketal phosphite of Example 5 by 200 grams of 2,2-bis-(dimethoxyphosphabutoxy)propane and using 1 gram of methyl iodide as the catalyst. The product was 2,2-bis-(methoxy)methanephosphonobutoxy)propane.

Example 15

The procedure of Example 9 was repeated replacing the ketal phosphite of Example 5 by 200 grams of the 5,6-monodecyl phosphite ester of 1,3,2,4-diisopropylidene sorbitol and using 1 gram of decyl iodide as the catalyst. The product was 5,6-decylphosphonate ester of 1,3,2,4-diisopropylidene sorbitol.

Example 16

100 grams of bis(4-(2-methyl-2-ethyl-1,3-dioxacyclopentyl)butyl)methanephosphonate (the ketal phosphonate of Example 9) was heated for 30 minutes at 80° C. with an equal weight of water. The pH of the mixture was between 2 and 4 due to a small residual acidity of the ketal phosphonate. By the end of the heating period, the reaction mixture was homogeneous due to hydrolysis of the ketal groups. There was no change in acidity indicating no hydrolysis of the phosphonate to phosphonic acid. The reaction mixture was cooled, neutralized to a pH of 7 with sodium hydroxide and the water was removed in vacuo. The filtered product was bis(5,6-dihydroxyhexyl)methylphosphonate, a colorless viscous liquid obtained in quantitative yield, and having a hydroxyl value of 694 (Theory 683) and having the formula

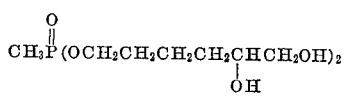

Example 17

The procedure of Example 16 was repeated replacing the ketal phosphonate of Example 9 by 100 grams of bis (3(1,4-dioxaspiro(5,5)decyl)methyl methanephosphonate (the ketal phosphonate of Example 10). The product was bis(2,3-dihydroxypropyl)methanephosphonate, a colorless syrup obtained in a yield of 98.7% and having the formula

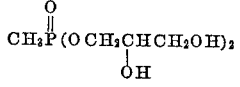

Example 18

The procedure of Example 16 was repeated replacing the ketal phosphonate of Example 9 by 100 grams of 2-(methane)-9-methyl-9-ethyl-1,3,8,10-tetraoxa - 2 - phosphono spiro (5,5) undecane. The product was 5,5-di-hydroxymethyl - 1,3 - dioxa - 2 - methanephosphonocyclohexane

Example 19

The procedure of Example 16 was repeated replacing the ketal phosphonate of Example 9 by 100 grams of 5,6-decanephosphonate ester of 1,3,2,4-diisopropylidene sorbitol. The product was the 5,6-decanephosphonate ester of sorbitol.

In addition to the compounds set forth supra the present invention in one aspect is directed to the preparation of compounds (acetals and ketals) having the formula

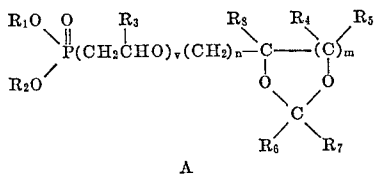
A or the formula

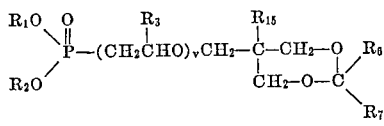
A'

In Formula A and A' above $R_1$ and $R_2$ are alkyl, alkenyl monocyclic carbocyclic aryl e.g. phenyl and alkyl phenyl, benzyl, alkylbenzyl, naphthyl or halophenyl, $R_3$ is hydrogen or lower alkyl, $R_4$ and $R_5$ are hydrogen or alkyl, $R_6$ and $R_7$ individually are hydrogen, alkyl, alkenyl, monocyclic carbocyclic aryl, e.g. phenyl and alkyl phenyl, naphthyl, halophenyl or nitrophenyl and

together can be a cycloalkyl ring of 5 to 6 carbon atoms, $R_8$ is hydrogen alkyl, phenyl or alkyl phenyl, $R_{15}$ is alkyl, $v$ is zero or an integer, $m$ is an integer between 1 and 2 inclusive and $n$ is an integer between 1 and 10 inclusive.

The compounds of the present invention in general are high boiling liquids.

Compounds of Formula A and A' have many uses. Thus they can be used as water dispersible wetting and suspending agents. They can also be employed as fire retardants for cellulose, cellulose esters, e.g. cellulose acetate and cellulose acetate butyrate, polyolefin resins, e.g. polyethylene, polypropylene, ethylene-propylene copolymers and copolymers of ethylene or propylene with monoolefins having more than 3 carbon atoms.

A particularly important use for the acetals and ketals of Formula A and A' is to hydrolyze them to give hydroxyl containing phosphonates having the following formula

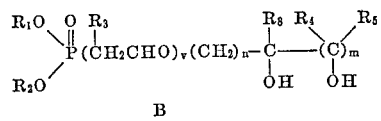
B or the formula

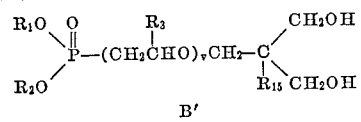
B'

In Formula B the terms $R_1$, $R_2$, $R_3$, $R_4$, $R_5$, $R_8$, $R_{15}$, $v$, $m$ and $n$ are the same as defined in Formula A and A'. The hydroxyl containing phosphonates of Formula B and B' have the uses set forth for the compounds of Formula A and in addition are useful for preparing polyurethanes by reaction with organic isocyanates, e.g. toluene diisocyanate and PAPI (polyphenylene isocyanate averaging about 3 units in the polymer). The polyurethanes can be prepared as foams or as elastomers. The presence of the phosphonate group renders the polyurethane flame resistant. The phosphonate of Formula B and B' need be used only as a portion of the polyols employed. Thus the use of 20% of a polyhydroxyl containing phosphonate of Formula B and 80% of another polyol, e.g. glycerine-propylene oxide adduct molecular weight 3000 or polypropylene glycol 2025 will give a polyurethane with improved flame resistance.

The novel compounds of Formula A can be prepared by several procedures. Thus they can be prepared in pure form by reacting (1) a trihydrocarbon phosphite, e.g. a trialkyl phosphite, or a trihalophenyl phosphite with (2) at least an equimolar amount of a 4-haloalkyl dioxolane or a 4-haloalkoxyalkyl dioxolane or a 4-haloalkyl dioxane or 4-haloalkoxyalkyl dioxane.

As the starting phosphite there can be used trimethyl phosphite, triethyl phosphite, tri n-propylphosphite, tri isopropyl phosphite, tri n-butyl phosphite tri sec. butyl phosphite, tri t-butyl phosphite, tri n-amyl phosphite, tri hexyl phosphite, tris decyl phosphite, tris n-octyl phosphite, tris 2-ethylhexyl phosphite, tris isooctyl phosphite, tris isodecyl phosphites, tris dodecyl phosphite, tris octadecyl phosphite, dimethyl ethyl phosphite, methyl diethyl phosphite, phenyl didecyl phosphite, diphenyl decyl phosphite, triphenyl phosphite, tri p-cresyl phosphite, tri m-cresyl phosphite, tri o-cresyl phosphite, tri xylenyl phosphite, tri α-naphthyl phosphite, tri β-naphthyl phosphite, tris cyclohexyl phosphite, tri oleyl phosphite, triallyl phosphite, tri o-chlorophenyl phosphite, tri p-chlorophenyl phosphite, dibutyl phenyl phosphite, tri m-chlorophenyl phosphite, tri p-bromophenyl phosphite, butyl diphenyl phosphite, methyl diphenyl phosphite, dioctyl phenyl phosphite, dimethyl phenyl phosphite, tris benzyl phosphite, tri cetyl phosphite, tris methylbenzyl phosphite.

The 4-haloalkyl dioxolane (or dioxane) type compound can be prepared in known fashion by reacting epichlorhydrin 1,2-epoxy-12-chlorododecane, 1,2-epoxy-4-chlorobutane, 1,2-epoxy-6-chlorohexane, 1,2-epoxypropoxyethyl chloride, 3-chloro-1,2-propylene glycol, 1,2-dihydroxy-12-chlorododecane, 1,3 - dihydroxy-4-chlorobutane, 1,3-dihydroxy-5-chloropentane, or 1,3-dihydroxy-12-chlorododecane with an aldehyde or ketone such as formaldehyde, isobutyraldehyde, acetaldehyde, propionaldehyde, butyraldehyde, valeraldehyde, lauraldehyde, stearaldehyde, isovaleraldehyde, heptaldehyde, benzaldehyde, acrolein, crotonaldehyde, oleic aldehyde, o-tolualdehyde, p-tolualdehyde, α-naphthaldehyde, β-naphthaldehyde, p-chlorobenzaldehyde, o-chlorobenzaldehyde, o-nitrobenzaldehyde, p-nitrobenzaldehyde, 2,4-dichlorobenzaldehyde, m-chlorobenzaldehyde, o-bromobenzaldehyde, hexahydrobenzaldehyde, acetone methyl ethyl ketone, methyl n-propyl ketone, diethyl ketone, hexanone-2, hexanone-3, methyl t-butyl ketone, di n-propyl ketone, diisopropyl ketone, disobutyl ketone, di no-amyl ketone, stearanone, cyclohexanone, cyclopentanone, benzaphenone, acetophenone, propiophenone, and methyl cyclohexanone.

Illustrative of such starting dioxolanes and dioxanes for preparing the compounds of Formula A are 2-methyl-2-ethyl-4-chloromethyl dioxolane,
2,5-dimethyl-2-ethyl-5-chloromethyl m-dioxane,
2,2,5-trimethyl-5-chloromethyl m-dioxane,
2,2-dimethyl-4-chloromethyl dioxolane,
4-chloromethyl dioxolane,
2-methyl-4-chloromethyl dioxolane,
2-ethyl-4-chloromethyl dioxolane,
2-propyl-4-chloromethyl dioxolane,
2-isopropyl-4-chloromethyl dioxolane,
2-undecyl-4-chloromethyl dioxolane,
2-heptadecyl-4-chloromethyl dioxolane,
2-heptadecenyl-4-chloromethyl dioxolane,
2-vinyl-4-chloromethyl dioxolane,
2-phenyl-4-chloromethyl dioxolane,
2-p-methylphenyl-4-chloromethyl dioxolane,
2-o-chlorophenyl-4-chloromethyl dioxolane,
2-m-nitrophenyl-4-chloromethyl dioxolane,
2-α-naphthyl-4-chloromethyl dioxolane,
2-m-bromophenyl-4-chloromethyl dioxolane,
2-methyl-2-propyl-4-chloromethyl dioxolane,
2,2-diethyl-4-chloromethyl dioxolane,
2-methyl-2-butyl-4-chloromethyl dioxolane,
2-ethyl-2-propyl-4-chloromethyl dioxolane, 2-methyl-2-t-butyl-4-chloromethyl dioxolane,
2,2-dipropyl-4-chloromethyl dioxolane,
2,2-diamyl-4-chloromethyl dioxolane,
2,2-diheptadecyl-4-chloromethyl dioxolane,
2-pentamethylene-4-chloromethyl dioxolane,
2-tetramethylene-4-chloromethyl dioxolane,
2,2-diphenyl-4-chloromethyl dioxolane,
2-methyl-2-phenyl-4-chloromethyl dioxolane,
2,2-dimethyl-4-chloroethoxymethyl dioxolane,
2,2-dimethyl-4-chloroisopropoxymethyl dioxolane,
2-methyl-2-ethyl-4-chloropolyethoxymethyl dioxolane wherein the polyethoxy contains 30 ethoxy groups, 2-methyl - 2-ethyl-4-chloropolyisopropoxymethyl dioxolane wherein the polyisopropoxy contains 25 isopropoxy groups, 2-methyl-4-chloro(ethyl)ethoxymethyl dioxolane,
2,2-dimethyl-4-chlorobutyl dioxolane,
2,2-dimethyl-4-chlorodecyl dioxolane,
2,2-dimethyl-4-chlorohexyl dioxolane,
2-methyl-2-ethyl-4-chlorobutyl dioxolane,
4-chlorobutyl dioxolane,
2-propyl-4-chlorobutyl dioxolane,
2,2,5-trimethyl-4-chloromethyl dioxolane,
2,2-dimethyl-5-ethyl-4-chloromethyl dioxolane,
2,4,5-trimethyl-2-ethyl-4-chloromethyl dioxolane,
2,5-dimethyl-5-chloromethyl m-dioxane,
2-methyl-2,5-diethyl-5-chloromethyl m-dioxane,
2,2-dimethyl-5-propyl-5-chloromethyl m-dioxane,
2,2-dimethyl-5-heptadecyl-5-chloromethyl m-dioxane,
5-methyl-5-chloromethyl m-dioxane,
5-ethyl-5-chloromethyl m-dioxane,
2-methyl-5-ethyl-5-chloromethyl m-dioxane,
2-butyl-5-methyl-5-chloromethyl m-dioxane,
2-isobutyl-5-ethyl-5-chloromethyl m-dioxane,
2-phenyl-5-methyl-5-chloromethyl m-dioxane,
2phenyl-5-methyl-5-chloromethyl m-dioxane,
2-phenyl-5-ethyl-5-chloromethyl m-dioxane,
2-p-methylphenyl-5-methyl-5-chloromethyl m-dioxane,
2-o-chlorophenyl-5-ethyl-5-chloromethyl m-dioxane,
2-m-nitrophenyl-5-methyl-5-chloromethyl m-dioxane,
2,2-dimethyl-5-ethyl-5-chloromethyl m-dioxane,
2,2,5-trimethyl-5-chloromethyl m-dioxane,
2-methyl-2-phenyl-5-ethyl-5-chloromethyl m-dioxane,
2,5-dimethyl-2-phenyl-5-chloromethyl m-dioxane,
2,2-diethyl-5-methyl-5-chloromethyl m-dioxane,
2-pentamethylene-5-methyl-5-chloromethyl m-dioxane,
2-pentamethylene-5-ethyl-5-chloromethyl m-dioxane,
2-cyclohexyl-5-methyl-5-chloromethyl m-dioxane,
2,2-diamyl-5-ethyl-5-chloromethyl m-dioxane, and
2,2-dimethyl-5-phenyl-5-chloromethyl m-dioxane.

The compounds of Formula A can also be formed by the Arbuzov rearrangements of the corresponding phosphite of parent Patent 3,096,345. If both $R_1$ and $R_2$ are aryl, halaryl or tert. alkyl, relatively pure products of Formula A are produced. There is employed an alkyl halide, alkenyl halide, aralkyl halide, halohydrin or epihalohydride with a phosphite of the parent patent that is isomeric with a phosphonate of Formula A. The iodides and bromides are preferred although there can also be employed the chloride. The halides are used in catalytic amounts, e.g., 0.5–5 mol percent based on the phosphite to be arranged in order to reduce the impurities to a minimum. Generally, however, using the Arbuzov rearrangement, however, some impurities are introduced since the $R_1$ and $R_2$ group can undergo rearrangement (unless they are aryl, haloaryl or tert. alkyl) as well as the dioxolanyl methyl to form a phosphonate. Additionally a certain amount of the alkyl group or the like of the catalyst can also enter the molecule by direct attachment to the phosphorus atom.

The Arbuzov rearrangement can be carried out at elevated temperature, e.e., 120–200° C. at atmospheric, sub- atmospheric or superatmospheric pressure. The halide remaining after the reaction is removed by distillation.

The halides which can be employed in the Arbuzov reaction include as stated previously methyl iodide, methyl bromide, ethyl bromide, ethyl iodide, n-propyl iodide, isopropyl iodide, amyl bromide, amyl chloride, amyl iodide, butyl bromide, butyl iodide, hexyl iodide, octyl bromide, octyl iodide, decyl bromide, decyl iodide, dodecyl iodide, octadecyl bromide, octadecyl iodide, allyl bromide, allyl iodide, allyl chloride, methallyl iodide, crotyl bromide, vinyl bromide, oleyl bromide, oleyl iodide, benzyl chloride, benzyl bromide, benzyl iodide, o-dodecylbenzyl chloride, p-dodecylbenzyl bromide, epichlorhydrin, epibromohydrin, epiiodohydrin, ethylene chlorohydrin, ethylene bromohydrin, ethylene iodohydrin, propylene chlorohydrin and propylene bromohydrin.

Illustrative of the phosphites which can be employed for the Arbuzov rearrangement to make compounds of Formula A are bis phenyl-4-(2-methyl-2-ethyl-1,3-dioxacyclo-pentyl) methyl phosphite,
dimethyl-4-(2-methyl-2-ethyl-1,3-dioxacyclo-pentyl) methyl phosphite,
bis octadecyl-4-(2-methyl-2-ethyl-1,3-dioxacyclopentyl) methyl phosphite,
bis p-butylphenyl-4-(2-methyl-2-ethyl-1,3-dioxacyclopentyl) methyl phosphite,
bis o-chlorophenyl-4-(2-methyl-2-ethyl-1,3-dioxacyclopentyl) methyl phosphite,
bis phenyl-5-(2,5-dimethyl-2-ethyl-1,3-dioxacyclohexyl) methyl phosphite,
dimethyl-5-(2,5-dimethyl-2-ethyl-1,3-dioxacyclohexyl) methyl phosphite,
bis lauryl-5-(2,5-dimethyl-2-ethyl-1,3-dioxacyclohexyl) methyl phosphite,
bis o-decylphenyl-5-(2,5-dimethyl-2-ethyl-1,3-dioxacyclohexyl) methyl phosphite,
bis m-chlorophenyl-5-(2,5-dimethyl-2-ethyl-1,3-dioxacyclohexyl) methyl phosphite,
dibutyl-5-(2,2,5-trimethyl-1,3-dioxacyclohexyl) methyl phosphite,
diphenyl-5-(2,2,5-trimethyl-1,3-dioxacyclohexyl) methyl phosphite,
dimethyl-4-(2-heptadecyl-1,3-dioxacyclopentyl) methyl phosphite,
bis octadecyl-4-(1,3-dioxacyclopentyl) methyl phosphite,
diphenyl-4-(2-methyl-1,3-dioxacyclophenyl) methyl phosphite,
bis oleyl-4-(2-ethyl-1,3-dioxacyclopentyl) methyl phosphite,
diphenyl-4-(2-propyl-1,3-dioxacyclopentyl) methyl phosphite,
dimethyl-4-(2-heptadecyl-1,3-dioxacyclopentyl) methyl phosphite,
diphenyl 4-(2-vinyl-1,3-dioxacyclopentyl) methyl phosphite,
bis octadecyl-4-(2-O-chlorophenyl-1,3-dioxacyclopentyl methyl phosphite,
di p-cresyl-4-(2-methyl-2-propyl-1,3-dioxacyclopentyl) methyl phosphite,
diamyl-4-(2,2-diethyl-1,3-dioxacyclopentyl) methyl phosphite,
diethyl-4-(2-methyl-2-t-butyl-1,3-dioxacyclopentyl) methyl phosphite,
diphenyl-4-(2,2-diheptadecyl-1,3-dioxacyclo-pentyl) methyl phosphite,
diphenyl-3-(1,4-dioxaspiro-(5,5)-decyl) methyl phosphite,
di-o-cresyl-4(2,2-diphenyl-1,3-dioxacyclopentyl) methyl phosphate,
diphenyl-4-(2-methyl-2-phenyl-1,3-dioxacyclopentyl) methyl phosphite,
diethyl-4-(1,3-dioxacyclopentyl) butyl phosphite,
dipropyl-4-(2-methyl-2-ethyl-1,3-dioxacyclopentyl) ethoxymethyl phosphite, butyl amyl-4-(2,2-dimethyl-1,3-dioxacyclopentyl) isopropoxymethyl phosphite, diethyl-4-(2,2-dimethyl-1,3-dioxacyclopentyl) polyethoxymethyl phospite where the polyethoxy contains 30 ethoxy groups, diphenyl - 5 - (2,5 - dimethyl-1,3-dioxacyclohexyl) methyl phosphite diamyl-5-(2-methyl-2,5-diethyl-1,3-dioxacyclohexyl) methyl phosphite, diphenyl-5-(5-methyl-1,3-dioxacyclohexyl) methyl phosphite, bis decyl-5-(5-ethyl-1,3-dioxacyclohexyl) methyl phosphite, dicyclohexyl-5-(2-methyl-5-methyl-1,3-dioxacyclohexyl) methyl phosphite, dimethyl-5-(2,2-dimethyl-5-ethyl-1,3-dioxacyclohexyl) methyl phosphite, and diphenyl-3-(3-ethyl-1,5-dioxaspiro-(6,6)-undecyl) methyl phosphite.

Illustrative of phosphonates of the present invention within Formula A are dimethyl-4-(2,2-dimethyl-1,3-dioxacyclopentyl) methyl phosphonate, dimethyl-4-(2-methyl-2-ethyl-1,3-doxacyclopentyl) methyl phosphonate, diethyl-4-(2,2-dimethyl-1,3-dioxacyclopentyl) methyl phosphonate, methyl ethyl-4-(2,2-dimethyl-1,3-dioxacyclopentyl) methyl phosphonate, diethyl-4-(2,2-diethyl-1,3-dioxacyclopentyl methyl phosphonate, dipropyl-4-(2,2-dimethyl-1,3dioxacyclopentyl methyl phosphonate, diisopropyl-4-(2-methyl-2-ethyl-1,3-dioxacyclopentyl) methyl phosphonate, di-t-butyl-4-(2,2-dimethyl-1,3-dioxacyclopentyl) methyl phosphonate, di-sec. butyl-4-(2-methyl-2-ethyl-1,3-dioxacyclopentyl) methyl phosphonate, dibutyl-4-(2,2-dimethyl-1,3-dioxacyclopentyl) methyl phosphonate, diamyl-4-(2,2-dimethyl-1,3-dioxacyclopentyl methyl phosphonate, dihexyl-4-(2-methyl-2-ethyl-1,3-dioxacyclopentyl) methyl phosphonate, dicyclohexyl 4-(2,2-dimethyl-1,3-dioxacyclopentyl) methyl phosphonate, diocyl-5-(2-methyl-2-ethyl-1,3-dioxacyclopentyl) methyl phosphonate, didecyl-4-(2,2-dimethyl-1,3-dioxacyclopentyl) methyl phosphonate, diisodecyl-4-(2-methyl-2-ethyl-1,3-dioxacyclopentyl) methyl phosphonate, dioctadecyl-4-(2,2-dimethyl-1,3-dioxacyclopentyl) methyl phosphonate, diallyl-4-(2,2-dimethyl-1,3-dioxacyclopentyl) methyl phosphonate, dicrotyl-4-(2-methyl-2-ethyl-1,3-dioxacyclopentyl) methyl phosphonate, dioleyl-4-(2,2-dimethyl-1,3-dioxacyclopentyl) methyl phosphonate, diphenyl-4-(2,2-dimethyl-1,3-dioxacyclopentyl) methyl phosphonate, diphenyl-4-(2-methyl-2-ethyl-1,3-dioxacyclopentyl) methyl phosphonate, phenyl decyl-4-(2-methyl-2-ethyl-1,3-dioxacyclopentyl) methyl phosphonate, phenyl methyl-4-(2,2-dimethyl-1,3-dioxacyclopentyl) methyl phosphonate, di-o-cresyl-4-(2,2-dimethyl-1,3-dioxacyclopentyl) methyl phosphonate, di-p-cresyl-4-(2-methyl-2-ethyl-1,3-dioxacyclopentyl) methyl phosphonate, di-3',5'xyleneyl-4-(2,2-dimethyl-1,3-dioxacyclopentyl) methyl phosphonate, di-p-butylphenyl-4-(2-methyl-2-ethyl-1,3-dioxacyclopentyl) methyl phosphonate, di p-chlorophenyl-4-(2,2-dimethyl-1,3-dioxacyclopentyl) methyl phosphonate, di-α-naphthyl-4-(2,2-dimethyl-1,3-dioxacyclopentyl) methyl phosphonate, di-β-naphthyl-4-(2-methyl-2-ethyl-1,3-dioxacyclopentyl) methyl phosphonate, di-o-bromophenyl-4-(2-methyl-2-ethyl-1,3-dioxacyclopentyl) methyl phosphonate, di-2',4'-dichlorophenyl-4-(2,2-dimethyl-1,3-dioxacyclopentyl) methyl phosphonate, dibenzyl-4-(2,2-dimethyl-1,3-dioxacyclopentyl) methyl phosphonate, di-4'-methylbenzyl-4-(2-methyl-2-ethyl-1,3-dioxacyclopentyl) methyl phosphonate, diethyl-5-(2,5-dimethyl-2-ethyl-1,3-dioxacyclohexyl) methyl phosphonate, di decyl-5-(2-methyl-2-ethyl-1,3-dioxacyclohexyl) methyl phosphonate, diphenyl-5-(2,5-dimethyl-2-ethyl-1,3-dioxacyclohexyl) methyl phosphonate, dimethyl-5-(2,2,5-trimethyl-1,3-dioxacyclohexyl) methyl phosphonate, ethyl amyl-4-(1,3-dioxacyclopentyl) methyl phosphonate, diphenyl-4-(1,3-dioxacyclopentyl) methyl phosphonate, dilauryl-4-(1,3-dioxacyclopentyl) methyl phosphonate, dimethyl-4-(2-methyl-1,3-dioxacyclopentyl) methyl phosphonate, di-m-cresyl-4-(2-methyl-1,3-dioxacyclopentyl) methyl phosphonate, phenyl dodecyl-4-(2-methyl-1,3-dioxacyclopentyl) methyl phosphonate, dibutyl-4-(2-ethyl-1,3-dioxacyclopentyl) methyl phosphonate, diphenyl-4-(2-propyl-1,3-dioxacyclopentyl) methyl phosphonate, dimethallyl-4-(2-isopropyl-1,3-dioxacyclopentyl) methyl phosphonate, diheptyl-4-(2-undecyl-1,3-dioxacyclopentyl) methyl phosphonate diphenyl-4-(2-heptadecyl-1,3-dioxacyclopentyl) methyl phosphonate, diethyl-4-(2-heptadecenyl-1,3-dioxacyclopentyl) methyl phosphonate, di-m-chlorophenyl-4-(2-vinyl-1,3-dioxacyclopentyl) methyl phosphonate, phenyl methyl-4-(2-phenyl-1,3-dioxacyclopentyl) methyl phosphonate, diethyl-4-(2-p-methylphenyl-1,3-dioxacyclopentyl) methyl phosphonate, di-methyl-4-(2-o-chlorophenyl-1,3-dioxacyclopentyl) methyl phosphonate, di-3',5'-xylenyl-4-(2-m-nitrophenyl-1,3-dioxacyclopentyl) methyl phosphonate, dicyclohexyl-4-(2-α-naphthyl-1,3-dioxacyclopentyl) methyl phosphonate, methyl octyl-4-(2-p-bromophenyl-1,3-dioxacyclopentyl) methyl phosphonate, dibutyl-4-(2-methyl-2-propyl-1,3-dioxacyclopentyl) methyl phosphonate, diphenyl-4-(2,2-diethyl-1,3-dioxacyclopentyl) phosphonate, dibenzyl-4-(2-methyl-2-butyl-1,3-dioxacyclopentyl) methyl phosphonate, dimethyl-4-(2-ethyl-2-propyl-1,3-dioxacyclopentyl) methyl phosphonate, dicetyl-4-(2-methyl-2-t.-butyl-1,3-dioxacyclopentyl) methyl phosphonate, diphenyl-4-(2,2-dipropyl-1,3-dioxacyclopentyl) methyl phosphonate, dimethyl-4-(2,2-diamyl-1,3-dioxacyclopentyl) methyl phosphonate, dimethyl-4-(2,2-diheptadecyl-1,3-dioxacyclopentyl) methyl phosphonate, diethyl-4-(2-pentamethylene-1,3-dioxacyclopentyl) methyl phosphonate,
diphenyl-4-(2-pentamethylene-1,3-dioxacyclopentyl) methyl phosphonate,
ethyl p-cresyl-4-(2-tetramethylene-1,3-dioxacyclopentyl) methyl phosphonate,
dipropyl-4-(2,2-diphenyl-1,3-dioxacyclopentyl) methyl phosphonate,
dimethyl-4-(2-methyl-2-phenyl-1,3-dioxacyclopentyl) methyl phosphonate,
dimethyl-4-(2,2-dimethyl-1,3-dioxacyclopentyl) methoxyethyl phosphonate,
diphenyl-4-(2,2-dimethyl-1,3-dioxacyclopentyl) methoxyisopropyl phosphonate,
diethyl--4-(2-methyl-2-ethyl-1,3-dioxacyclopentyl) methoxy polyethoxy ethyl phosphonte wherein there are 29 ethoxy groups, phenyl p-cresyl-4-(2-methyl-2-ethyl-1,3-dioxacyclopentyl) methoxy polyisoproxy isopropyl phosphonate wherein there are 24 isopropyl groups, dimethyl-4-(2-methyl-1,3-dioxacyclopentyl) (ethyl) methoxyethyl phosphonate,
ethyl butyl-4-(2,2-dimethyl-1,3-dioxacyclopentyl) butyl phosphonate,
diphenyl-4-(2,2-dimethyl-1,3-dioxacyclopentyl) decyl phosphonate,
diethyl-4-(2,2-dimethyl-1,3-dioxacyclopentyl) decyl phosphonate,
dimethyl-4-(2,2-dimethyl-1,3-dioxacyclopentyl) hexyl phosphonate,
diphenyl-4-(2-methyl-2-ethyl-1,3-dioxacyclopentyl) butyl phosphonate,
diamyl-4-(1,3-dioxacyclopentyl) butyl phosphonate,
di-p-cresyl-4-(2-propyl-1,3-dioxacyclopentyl) butyl phosphonate,
diethyl-4-(2,2,5-trimethyl-1,3-dioxacyclopentyl) methyl phosphonate,
diphenyl-4-(2,2-dimethyl-5-ethyl-1,3-dioxacyclopentyl) methyl phosphonate,
diisopropyl-4-(2,4-5-trimethyl-2-ethyl-1,3-dioxacyclopentyl) methyl phosphonate,
diphenyl-5-(2,5-dimethyl-1,3-dioxacyclohexyl) methyl phosphonate,
dimethyl-5-(2-methyl-2,5-diethyl-1,3-dioxacyclohexyl) methyl phosphonate,
dioctadecyl-5-(2,2-dimethyl-5-propyl-1,3-dioxacyclopentyl) methyl phosphonate,
diallyl-5-(2,2-dimethyl-5-heptadecyl-1,3-dioxacyclohexyl) methyl phosphonate,
diethyl-5-(5-methyl-1,3-dioxacyclohexyl) methyl phosphonate,
diphenyl-5-(5-ethyl-1,3-dioxacyclohexyl) methyl phosphonate,
dimethyl-5-(2-methyl-5-ethyl-1,3-dioxacyclohexyl) methyl phosphonate,
diphenyl-5-(2-butyl-5-methyl-1,3-dioxacyclohexyl) methyl phosphonate,
dibutyl-5-(2-isobutyl-5-ethyl-1,3-dioxacyclohexyl) methyl phosphonate,
diiooctyl-5-(2-phenyl-5-methyl-1,3-dioxacyclohexyl) methyl phosphonate,
ethyl butyl-5-(2-phenyl-5-ethyl-1,3-dioxacyclohexyl) methyl phosphonate,
diphenyl-5-(2-p-methyl-phenyl-5-methyl-1,3-dioxacyclohexyl) methyl phosphonate,
dimethyl-5-(2-o-chlorophenyl-5-ethyl-1,3-dioxacyclohexyl) methyl phosphonate,
diethyl-5-(2-m-nitrophenyl-5-methyl-1,3-dioxacyclohexyl) methyl phosphonate,
didecyl-5-(2,2-dimethyl-5-ethyl-1,3-dioxacyclohexyl) methyl phosphonate,
diphenyl-5-(2,2,5-trimethyl-1,3-dioxacyclohexyl) methyl phosphonate,
dibutyl-5-(2-methyl-2-phenyl-5-ethyl-1,3-dioxacyclohexyl) methyl phosphonate,
dimethyl-5-(2,5-dimethyl-2-phenyl-1,3-dioxacyclohexyl) methyl phosphonate,
dimethallyl-5-(2,2-diethyl-5-methyl-1,3-dioxacyclohexyl) methyl phosphonate,
diethyl-5-(2-pentamethylene-5-methyl-1,3-dioxacyclohexyl) methyl phosphonate,
diphenyl-5-(2-pentamethylene-5-ethyl-1,3-dioxacyclohexyl) methyl phosphonate,
diphenyl-5-(2-pentamethylene-5-ethyl-1,3-dioxacyclohexyl) methyl phosphonate,
dimethyl-5-(2-cyclohexyl-5-methyl-1,3-dioxacyclohexyl) methyl phosphonate,
diethyl-5-(2,2-diamyl-5-ethyl-1,3-dioxacyclohexyl) methyl phosphonate,
diphenyl-5-(2,2-dimethyl-5-phenyl-1,3-doxacyclohexyl) methyl phosphonate.

The compounds of Formula B are prepared by hydrolysis of the compounds of Formula A. The hydrolysis carried out with the aid of water, preferably with heating e.g., up to 100° C. To hasten hydrolysis there can be added a small amount of acid, e.g., hydrochloric acid. After hydrolysis is complete, an alkaline material, e.g., sodium hydroxide, sodium carbonate, sodium bicarbonate, potassium hydroxide or potassium carbonate can be added to neutralize the product.

Illustrative of phosphonates within Formula B are dimethyl 2,3-dihydroxypropyl phosphonate $$[(C_2H_5O)_2\overset{O}{\underset{\|}{P}}CH_2CHOHCH_2OH]$$

diethyl 2,3-dihydroxypropyl phosphonate,
methyl ethyl 2,3-dihydroxypropyl phosphonate dipropyl 2,3-dihydroxypropyl phosphonate,
diisopropyl 2,3-dihydroxypropyl phosphonate,
dibutyl 2,3-dihydroxypropyl phosphonate di sec. butyl 2,3-dihydroxypropyl phosphonate di t.butyl 2,3-dihydroxypropyl phosphonate,
diamyl 2,3-dihydroxypropyl phosphonate,
dihexyl 2,3-dihydroxypropyl phosphonate dicyclohexyl 2,3-dihydroxypropyl phosphonate,
diheptyl 2,3-dihydroxypropyl phosphonate,
dioctyl 2,3-dihydroxypropyl phosphonate,
didecyl 2,3-dihydroxypropyl phosphonate,
diisodecyl 2,3-dihydroxypropyl phosphonate,
dilauryl 2,3-dihydroxypropyl phosphonate,
dicetyl 2,3-dihydroxypropyl phosphonate,
dioctadecyl 2,3-dihydroxypropyl phosphonate,
diallyl 2,3-dihydroxypropyl phosphonate,
dicrotyl 2,3-dihydroxypropyl phosphonate,
dimethallyl 2,3-dihydroxypropyl phosphonate,
phenyl decyl 2,3-dihydroxypropyl phosphonate,
diphenyl 2,3-dihydroxypropyl phosphonate,
di p-cresyl 2,3-dihydroxypropyl phosphonate,
di-α-naphthyl 2,3-dihydroxypropyl phosphonate,
di-β-naphthyl 2,3-dihydroxypropyl phosphonate,
di-p-chlorophenyl 2,3-dihydroxypropyl phosphonate,
di-p-bromophenyl 2,3-dihydroxypropyl phosphonate,
di 3,5-xylenyl 2,3-dihydroxypropyl phosphonate di-4' methylbenzyl 2,3-dihydroxypropyl phosphonate phenyl methyl 2,3-dihydroxypropyl phosphonate,
di-o-cresyl 2,3-dihydroxypropyl phosphonate,
di-p-butylphenyl 2,3-dihydroxypropyl phosphonate,
di 2',4'-dichlorophenyl 2,3-dihydroxypropyl phosphonate,
diethyl 2,2-di(hydroxymethyl) propyl phosphonate

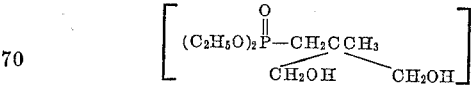

didecyl 2,2-di-(hydroxymethyl) ethyl phosphonate,
diphenyl 2,2-di-(hydroxymethyl) propyl phosphonate,
dimethyl 2,2-di-(hydroxymethyl) propyl phosphonate,
ethyl amyl 2,3-dihydroxypropyl phosphonate, di-m-cresyl 2,3-dihydroxypropyl phosphonate,
phenyl dodecyl 2,3-dihydroxypropyl phosphonate,
di m-chlorophenyl 2,3-dihydroxypropyl phosphonate,
methyl octyl 2,3-dihydroxypropyl phosphonate,
dibenzyl 2,3-dihydroxypropyl phosphonate,
p-cresyl ethyl 2,3-dihydroxypropyl phosphonate,
dimethyl 3-oxa-5,6-dihydroxyhexyl phosphonate,
diphenyl 3-oxa-2-methyl-5,6-dihydroxyhexyl phosphonate,
diethyl 2,3-dihydroxypropoxy polyethoxy ethyl phosphonate wherein there are 29 ethoxy groups.

[(C_2H_5O)_2PCH_2CH_2(OCH_2CH_2)_{29}CH_2CHOHCH_2OH]
$\quad\quad\quad\quad\quad\quad\quad\quad\quad\quad\quad\quad$CH_2CHOHCH_2OH]

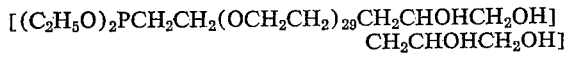

phenyl p-cresyl 2,3-dihydroxy propoxypolyisoproxy isopropyl phosphonate wherein there are 24 isopropoxy groups,
phenyl p-cresyl 2,3-dihydroxypropyl phosphonate,
dimethyl 2-ethyl-3-oxa-5,6-dihydroxypropyl phosphonate
ethyl butyl 5,6-dihydroxyhexyl phosphonate,
diphenyl,11,12-dihydroxydodecyl phosphonate,
diethyl 11,12-dihydroxydodecyl phosphonate,
dimethyl 7,8-dihydroxyoctyl phosphonate,
diphenyl 5,6-dihydroxyhexyl phosphonate,
diamyl 5,6-dihydroxyhexyl phosphonate,
di-p-cresyl 5,6-dihydroxyhexyl phosphonate,
diethyl 2,3-dihydroxybutyl phosphonate,
diphenyl 2,3-dihydroxyamyl phosphonate,
diisopropyl 2,3-dihydroxybutyl phosphonate,
diethyl 2,2-di(hydroxymethyl) propyl phosphonate,
dioctadecyl 2,2-di (hydroxymethyl) amyl phosphonate
diallyl,
2,2-di(hydroxymethyl) eicosanyl phosphonate,
diphenyl 2,2-di(hydroxymethyl) butyl phosphonate,
dimethyl 2,2-di-(hydroxymethyl) butyl phosphonate,
dibutyl 2,2-di(hydroxymethyl) butyl phosphonate,
diisooctyl 2,2-di-(hydroxymethyl) propyl phosphonate,
ethyl butyl 2,2-di-(hydroxymethyl) butyl phosphonate,
didecyl 2,2-di(hydroxymethyl) butyl phosphonate,
dimethallyl 2,2-di(hydroxymethyl) propyl phosphonate
and
diphenyl 2,2-di(hydroxymethyl)2-phenyl ethyl phosphonate.

Example I 1 mole of trimethyl phosphite was refluxed for 24 hours with 1.3 moles of 2,2-dimethyl-4-chloromethyl dioxolane. (The 2,2-dimethyl-4-chloromethyldioxolane was prepared from epichlorhydrin and acetone as set forth in Petrov, J. Gen. Chem. (USSR) 10, pages 981–96(1940); Chem. Abst. 35, 3603(1941). Titration of 2.0 gram sample of the reaction mixture with 0.1 N iodine solution in benzene showed that the reaction was substantially complete. The product was isolated by fractional distillation to give a 62% yield of dimethyl-4-(2,2-dimethyl-1,3-dioxacyclopentyl) methyl phosphonate as a colorless liquid B.P. 110–114° C. at 10 mm. having the formula

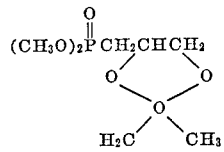

This compound can also be called dimethyl-5(2,2-dimethyl-1,3-dioxyacyclopentyl) methyl phosphonate.

Example II

The procedure of Example I was repeated using 1.3 moles of 2,2-dimethyl-4-chloromethyl dioxolane with 1 mole of trimethyl phosphite to produce dimethyl-4(2-methyl-2-ethyl-1,3-dioxacyclopentyl) methyl phosphonate as the product.

Example III

The procedure of Example I was repeated using 1.3 moles of 2-methyl-2-ethyl-4-chloromethyl dioxolane with 1 mole of tris isodecyl phosphite to produce di-isodecyl-4-(2-methyl-2-ethyl-1,3-dioxyacyclopentyl) methyl phosphonate as the product.

Example IV

The procedure of Example I was repeated using 1.3 moles of 2,2-dimethyl-4-chloromethyl dioxolane with 1 mole of triallyl phosphite to produce diallyl-4-(2,2-dimethyl 1,3-dioxacyclopentyl) methyl phosphonate as the product.

Example V

The procedure of Example I was repeated using 1.3 moles of 2,2-dimethyl-4-chloromethyl dioxolane with 1 mole of triphenyl phosphite to produce diphenyl-4-(2,2-dimethyl-1,3-dioxacyclopentyl) methyl phosphonate as the product.

Example VI

The procedure of Example I was repeated using 1.3 moles of 2,5-dimethyl-2-ethyl-5-chloromethyl m-dioxane with 1 mole of triethyl phosphite to produce diethyl-5-(2,5-dimethyl-2-ethyl-1,3-dioxacyclohexyl) methyl phosphonate as the product.

Example VII 200 grams of dimethyl-4-(2-methyl-2-ethyl-1,3-dioxacyclopentyl) methyl phosphite was heated for 7 hours at 140–150° C. with 1 gram of amyl iodide as a catalyst to produce dimethyl-4-(2-methyl-2-ethyl-1,3-dioxacyclopentyl) methyl phosphonate.

Example VIII 200 grams of dipropyl-4-(2-methyl-2-ethyl-1,3-dioxacyclopentyl) ethoxymethyl phosphite was heated for 7 hours at 140–150° C. with 1 gram of propyl iodide as a catalyst to produce dipropyl-4-(2-methyl-2-ethyl-1,3-dioxacyclopentyl) ethoxymethyl phosphonate.

Example IX 100 grams of dimethyl-4-(2,2-dimethyl-1,3-dioxacyclopentyl) methyl phosphonate was heated for 30 minutes at 80° C. with an equal weight of water. The reaction mixture was cooled, neutralized to a pH of 7 with sodium hydroxide and water was removed in a vacuum. The filtered product was dimethyl 2,3-dihydroxypropyl phosphonate.

Example X

The procedure of Example IX was repeated with 100 grams of diphenyl-4-(2,2-dimethyl-1,3-dioxacyclopentyl) methyl phosphonate and 100 grams of water to produce diphenyl 2,3-dihydroxypropyl phosphonate.

Example XI

The procedure of Example IX was repeated with 100 grams of diisodecyl-4 (2-methyl-2-ethyl-1,3-dioxacyclopentyl) methyl phosphonate to produce diisodecyl 2,3-dihydroxypropyl phosphonate.

What is claimed is:
1.

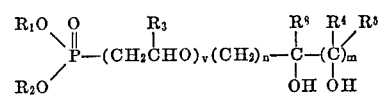

where

R_1 and R_2 are selected from the group consisting of alkyl, alkenyl, monocyclic carbocyclic aryl, naphthyl, benzyl, alkyl benzyl, chlorophenyl and bromophenyl;
R_3 is selected from the group consisting of hydrogen and lower alkyl;
R_4 and R_5 are selected from the group consisting of hydrogen and alkyl;
R_8 is selected from the group consisting of hydrogen, alkyl and monocyclic carbocyclic aryl;

$v$ is an integer of at least zero;
$m$ is an integer between 1 and 2 inclusive; and
$n$ is an integer between 1 and 10 inclusive.

2. Dialkyl 2,3-dihydroxypropyl phosphonate.

3. Di monocyclic carbocyclic aryl 2,3-dihydroxypropyl phosphonate.

4. Monocyclic carbocyclic aryl alkyl 2,3-dihydroxypropyl phosphonate.

5.

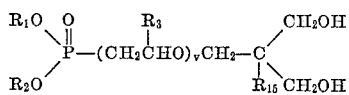

where
$R_1$ and $R_2$ are selected from the group consisting of alkyl, alkenyl, monocyclic carbocyclic aryl, naphthyl, benzyl, alkyl benzyl, chlorophenyl and bromophenyl;
$R_3$ is selected from the group consisting of hydrogen and lower alkyl;
$R_{15}$ is alkyl; and
$v$ is an integer of 0 to 100.

References Cited

Rodd: "Chemistry, of Carbon Compounds," Elsevier Publishing Co., New York, vol. IV, Part A, p. 332, (1957).

CHARLES B. PARKER, *Primary Examiner.*

A. H. SUTTO, *Assistant Examiner.*